United States Patent [19]

Atsuumi

[11] Patent Number: 5,684,618
[45] Date of Patent: Nov. 4, 1997

[54] IMAGE FORMING MIRROR FOR EQUAL SPEED OPTICAL SCAN AND OPTICAL SCANNER

[75] Inventor: Hiromichi Atsuumi, Kanagawa-ken, Japan

[73] Assignee: Ricoh Company, Ltd., Tokyo, Japan

[21] Appl. No.: 596,014

[22] Filed: Feb. 6, 1996

Related U.S. Application Data

[62] Division of Ser. No. 306,000, Sep. 16, 1994, abandoned.

[30] Foreign Application Priority Data

| Sep. 20, 1993 | [JP] | Japan | 5-233679 |
| Sep. 30, 1993 | [JP] | Japan | 5-245002 |
| Dec. 3, 1993 | [JP] | Japan | 5-304419 |

[51] Int. Cl.$^6$ ............................................. G02B 26/08
[52] U.S. Cl. ........................... 359/208; 359/205; 359/207
[58] Field of Search .................................. 359/205–208, 359/212–219, 710, 711, 728–729; 347/256–261

[56] References Cited

U.S. PATENT DOCUMENTS

| 4,941,719 | 7/1990 | Hisada et al. | |
| 5,233,454 | 8/1993 | Sakuma et al. | |
| 5,353,047 | 10/1994 | Nakamura et al. | 359/208 |
| 5,408,095 | 4/1995 | Atsuumi et al. | 359/208 |
| 5,426,298 | 6/1995 | Sakuma et al. | 359/205 |
| 5,504,613 | 4/1996 | Itabashi et al. | 359/208 |

FOREIGN PATENT DOCUMENTS 1-200221  8/1989  Japan.

*Primary Examiner*—James Phan
*Attorney, Agent, or Firm*—Dickstein Shapiro Morin & Oshinsky LLP

[57] ABSTRACT

An optical scanner comprising an image forming mirror for an equal speed optical scan and for field curvature correction, a light beam is emitted from a light source device and is deflected by an optical deflector at an equal angular velocity. This deflected light beam is converged onto a scanned face and a scanning speed of a light spot on the scanned face is equalized. The image forming mirror has a reflecting face formed in coaxial, aspherical and concave shapes. The reflecting face is obtained by rotating a curve X(H) represented by the following formula, $$X(H) = CH^2/[1+\sqrt{1-(1+K)C^2H^2}] + \Sigma A_i \cdot H^{**i}$$

around an X-axis. The curve X(H) is set such that a parameter ΔX(H) represented by $$\Delta X(H) = X(H) - C'H^2/[1+\sqrt{1-C'^2H^2}]$$

satisfies the following condition (I), $$-3.0 \times 10^{-5} < \Delta X(H=0.1f)/f < 3.0 \times 10^{-5} \qquad (I)$$

when $C' = C + 2A_2$ and f is set to a focal length of the reflecting face.

6 Claims, 17 Drawing Sheets

ω = 35°

-10.000  10.000 (mm)
FIELD CURVATURE

ω = 35°

-2.000  2.000(%)
SCANNING
CHARACTERISTICS

ω = 35°

-10.000  10.000(mm)
FIELD CURVATURE

ω = 35°

-2.000  2.000(%)
SCANNING
CHARACTERISTICS

ω = 35°

-10.000   10.000(mm)
FIELD CURVATURE

ω = 35°

-2.000   2.000(%)
SCANNING
CHARACTERISTICS

ω = 35°

-10.000   10.000(mm)
FIELD CURVATURE

ω = 35°

-2.000   2.000(%)
SCANNING
CHARACTERISTICS

ω = 35°

FIELD CURVATURE

-10.000   10.000(mm)

ω = 35°

-2.000   2.000(%)

SCANNING CHARACTERISTICS

ω = 35°

-10.000   10.000(mm)

FIELD CURVATURE

ω = 35°

-2.000   2.000(%)

SCANNING CHARACTERISTICS

FIELD CURVATURE

SCANNING CHARACTERISTICS

FIELD CURVATURE

SCANNING CHARACTERISTICS

ω = 35°

-4.000   4.000(mm)
FIELD CURVATURE

ω = 35°

-2.000   2.000(%)
SCANNING CHARACTERISTICS

ω = 35°

-10.000    10.000(mm)

FIELD CURVATURE

ω = 35°

-2.000    2.000(%)

SCANNING CHARACTERISTICS

ω = 35°

-10.000    10.000(mm)

FIELD CURVATURE

ω = 35°

-2.000    2.000(%)

SCANNING CHARACTERISTICS

ω = 35°

-10.000   10.000(mm)
FIELD CURVATURE

ω = 35°

-2.000   2.000(%)
SCANNING CHARACTERISTICS

ω = 35°

-10.000   10.000(mm)
FIELD CURVATURE

ω = 35°

-2.000   2.000(%)
SCANNING CHARACTERISTICS

ω = 35°

FIELD CURVATURE

ω = 35°

SCANNING CHARACTERISTICS

ω = 35°

FIELD CURVATURE

ω = 35°

SCANNING CHARACTERISTICS

ω = 35°

-10.000   10.000(mm)
FIELD CURVATURE

ω = 35°

-2.000   2.000(%)
SCANNING CHARACTERISTICS

ω = 35°

-10.000   10.000(mm)
FIELD CURVATURE

ω = 35°

-2.000   2.000(%)
SCANNING CHARACTERISTICS

ω = 35°

FIELD CURVATURE  SCANNING CHARACTERISTICS  CURVE OF SCANNING LINE

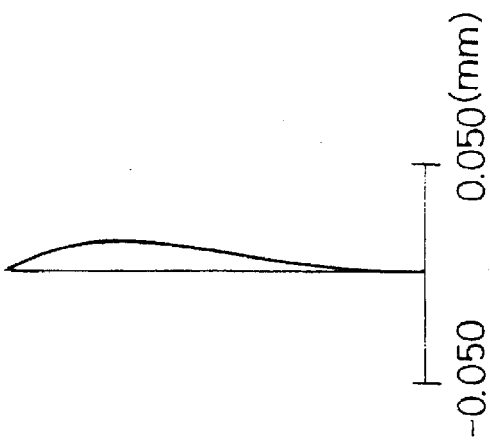
Fig. 28b
Fig. 28b
Fig. 28c
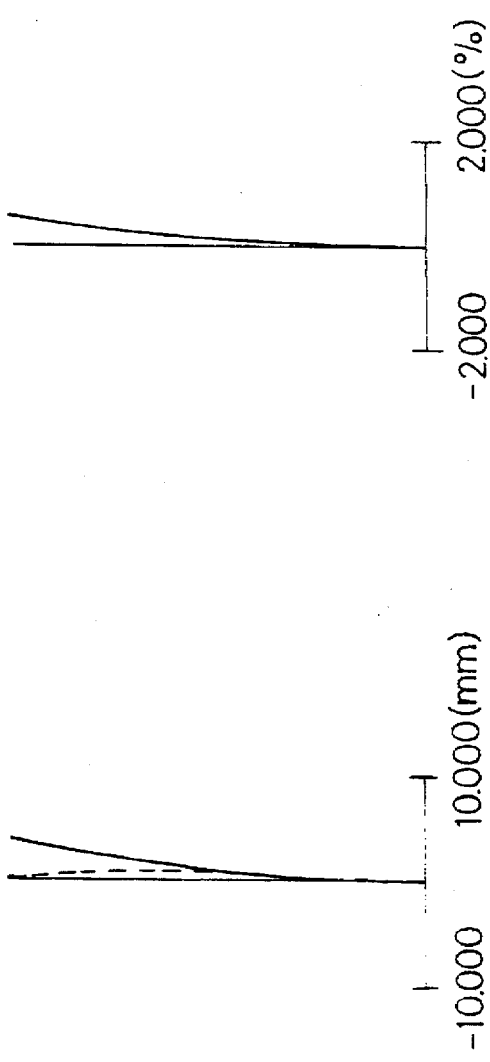

IMAGE FORMING MIRROR FOR EQUAL SPEED OPTICAL SCAN AND OPTICAL SCANNER

This application is a division of application Ser. No. 08/306,000, filed Sep. 16, 1994, abandoned.

BACKGROUND OF THE INVENTION

1. Field of the Invention

The present invention relates to an image forming mirror for an equal speed optical scan and an optical scanner using this image forming mirror.

2. Description of the Related Art

Various kinds of optical scanners are generally known in association with an optical printer, etc. In these optical scanners, a light beam deflected at an equal angular velocity is converged onto a scanned face as a light spot to scan the scanned face. An f θ lens is generally known as an optical system for converging the deflected light beam as a light spot on the scanned face and performing an optical scanning operation using the light spot at an equal speed. However, for example, an image forming mirror having a linearity correcting function has been recently proposed and used instead of the fθ lens in Japanese Patent Application Laying. Open (KOKAI) No. 1-200221. In this patent specification, this image forming mirror is called an image forming mirror for an equal speed optical scan.

A high density record is recently required to improve the quality of a written image in the optical scanner. To realize this high density record, it is necessary in any case to set a diameter of the light spot for scanning the scanned face such that this diameter is not greatly changed in accordance with an image height. The diameter of the light spot is influenced by field curvature of an image forming system for converging the deflected light beam as a light spot on the scanned face.

One pixel is recently divided into a plurality of pixel portions in a main scanning direction so as to represent multivalued gradations by area modulation. In such an optical scanning operation, it is particularly important to correct field curvature of an image in the main scanning direction.

Linearity of the image can be adjusted to a certain extent by electrically correcting writing timing of a pixel signal. However, there is a limit in this adjustment. It is desirable to preferably correct the linearity to particularly realize the high density record.

Further, when there is a so-called deflecting face inclination of an optical deflector for deflecting the light beam at an equal angular velocity, the position of a main scanning line scanned by the light spot is changed in a cross scanning direction so that so-called jitters are caused.

SUMMARY OF THE INVENTION

It is therefore a first object of the present invention to provide a novel image forming mirror for an equal speed optical scan in which field curvature is preferably corrected and an optical scanning operation is preferably performed at an equal speed.

A second object of the present invention is to provide a novel optical scanner for preferably performing an optical scanning operation at an equal speed and stabilizing the diameter of a light spot.

A third object of the present invention is to provide a novel optical scanner for preferably performing an optical scanning operation at an equal speed and stabilizing the diameter of a light spot and able to correct a deflecting face inclination of an optical deflector.

A fourth object of the present invention is to provide a novel image forming mirror for an equal speed optical scan for preferably correcting field curvature and performing an optical scanning operation at an equal speed and able to correct a deflecting face inclination of an optical deflector.

A fifth object of the present invention is to provide a novel optical scanner for preferably performing an optical scanning operation at an equal speed and stabilizing the diameter of a light spot and able to correct a deflecting face inclination of an optical deflector.

In accordance with a first construction of the present invention, the above first object can be achieved by an image forming mirror for an equal speed optical scan in which a light beam deflected at an equal angular velocity is converged onto a scanned face and a scanning speed of a light spot on the scanned face is equalized;

the image forming mirror having a reflecting face formed in coaxial, aspherical and concave shapes;

the reflecting face being obtained by rotating a curve X(H) represented by the following formula, $$X(H) = CH^2/[1+\sqrt{1-(1+K)C^2H^2}] + \Sigma A_i \cdot H^{**i}$$

around an X-axis where the variable $A_i$ is an aspherical coefficient and i is a whole number; and the curve X(H) being set such that a value ΔX(H) represented by $$\Delta X(H) = X(H) - C'H^2/[1+\sqrt{1-C'^2H^2}]$$

satisfies the following condition (I), $$-3.0 \times 10^{-5} < \Delta X(H=0.1f)/f < 3.0 \times 10^{-5} \quad (I)$$

when $C' = C + 2A_2$ and f is set to a focal length of the reflecting face.

In accordance with a second construction of the present invention, the above second object can be achieved by an optical scanner comprising:

a light source device for emitting a light beam fop an optical scan;

an optical deflector for reflecting the light beam from this light source device on a deflecting-reflecting face and deflecting the light beam as a deflected light beam at an equal angular velocity;

an image forming mirror for converging the deflected light beam as a light spot onto a scanned face and performing an optical scanning operation using the light spot at an equal speed; and optical path separating means for separating an optical path of the light beam reflected on this image forming mirror from an incident optical path from the light source device to the image forming mirror;

the image forming mirror being constructed by an image forming mirror for an equal speed optical scan in which the light beam deflected at the equal angular velocity is converged onto the scanned face and a scanning speed of the light spot on the scanned face is equalized;

the image forming mirror having a reflecting face formed in coaxial, aspherical and concave shapes;

the reflecting face being obtained by rotating a curve X(H) represented by the following formula, $$X(H)=CH^2/[1\ 30\ \sqrt{\{1-(1+K)C^2H^2\}}]+\Sigma Ai\cdot H^{**i}$$

around an X-axis where the variable Ai is an aspherical coefficient and i is a whole number; and the curve X(H) being set such that a value ΔX(H) represented by $$\Delta X(H)=x(H)-C'H^2/[1+\sqrt{\{1-C'^2H^2\}}]$$

satisfies the following condition (I), $$-3.0\times 10^{-5}<\Delta X(H=0.1f)/f<3.0\times 10^{-5} \quad (I)$$

when $C'=C+2A_2$ and f is set to a focal length of the reflecting face.

In accordance with a fourth construction of the present invention, the above second object can be also achieved by the optical scanner having the second construction in which the light beam incident to the deflecting-reflecting face of the optical deflector is convergent or divergent.

In accordance with a sixth construction of the present invention, the above second object can be also achieved by the optical scanner having the second construction in which the light beam emitted from the light source device is a parallel light beam.

In accordance with a third construction of the present invention, the above third object can be achieved by an optical scanner comprising:

a light source device for emitting a light beam for an optical scan;

a linear image forming optical system for converging the light beam from this light source device in a cross scan-corresponding direction and focusing and forming this light beam as a linear image extending in a main scan-corresponding direction;

an optical deflector having a deflecting-reflecting face in the vicinity of a forming position of the linear image and deflecting a reflected light beam as a deflected light beam at an equal angular velocity;

an image forming mirror for converging the deflected light beam onto a scanned face;

optical path separating means for separating an optical path of the light beam reflected on this image forming mirror from an incident optical path from the light source device to the image forming mirror; and an elongated toroidal lens extending in the main scan-corresponding direction and separated by this optical path separating means and arranged on an optical path from the image forming mirror toward the scanned face;

the elongated toroidal lens converging the deflected light beam as a light spot onto the scanned face in cooperation with the image forming mirror;

the image forming mirror being constructed by an image forming mirror for an equal speed optical scan in which the light beam deflected at the equal angular velocity is converged onto the scanned face and a scanning speed of the light spot on the scanned face is equalized;

the image forming mirror having a reflecting face formed in coaxial, aspherical and concave shapes;

the reflecting face being obtained by rotating a curve X(H) represented by the following formula, $$X(H)=CH^2/[1+\sqrt{\{1-(1+K)C^2H^2\}}]+\Sigma Ai\cdot H^{**i}$$

around an X-axis where the variable Ai is an aspherical coefficient and i is a whole number; and the curve X(H) being set such that a value a X(H) represented by $$\Delta X(H)=X(H)-C'H^2/[1+\sqrt{\{1-C'^2H^2\}}]$$

satisfies the following condition (I), $$-3.0\times 10^{-5}<\Delta X(H=0.1f)/f<3.0\times 10^{-5} \quad (I)$$

when $C'=C+2A_2$ and f is set to a focal length of the reflecting face;

the elongated toroidal lens having a barrel type toroidal face as a concave face formed such that this barrel type toroidal face is obtained by rotating a curve having an aspherical shape around an axis parallel to the main scan-corresponding direction and has a radius of curvature in the cross scan-corresponding direction reduced as the barrel type toroidal face is separated from an optical axis thereof in a main scanning direction; and the elongated toroidal lens having a normal toroidal face as a convex face.

In accordance with a fifth construction of the present invention, the above third object can be also achieved by the optical scanner having the third construction in which the light beam incident to the deflecting-reflecting face of the optical deflector is convergent or divergent with respect to the main scan-corresponding direction.

In accordance with the sixth construction of the present invention, the above third object can be also achieved by the optical scanner having the third construction in which the light beam emitted from the light source device is a parallel light beam.

In accordance with a seventh construction of the present invention, the above fourth object can be achieved by an image forming mirror for an equal speed optical scan in which a light beam deflected at an equal angular velocity and divergent with respect to a cross scan-corresponding direction is converged as a light spot onto a scanned face and a scanning speed of the light spot on the scanned face is equalized;

the image forming mirror having a reflecting face formed in concave and aspherical shapes;

the reflecting face being obtained by rotating a curve X(H) represented by the following formula, $$X(H)=CH^2/[1+\sqrt{\{1-(1+K)C^2H^2\}}]+\Sigma Ai\cdot H^{**i}$$

around an axis parallel to an H-axis where the variable Ai is an aspherical coefficient and i is a whole number; and the curve X(H) being set such that a value ΔX(H) defined by $$\Delta X(H)=X(H)-C'H^2/[1+\sqrt{\{1-C'^2H^2\}}]$$

satisfies the following condition (I), $$-3.0\times 10^{-5}<\Delta X(H=0.1f)/f<3.0\times 10^{-5} \quad (I)$$

when $C'=C+2A_2$ and f is set to a focal length of the reflecting face on an X-H face.

In accordance with an eighth construction of the present invention, the above fifth object can be achieved by an optical scanner comprising:

a light source device for emitting a light beam for an optical scan;

a linear image forming optical system for converging the light beam from this light source device in a cross scan-corresponding direction and focusing and forming this light beam as a linear image extending in a main scan-corresponding direction;

an optical deflector having a deflecting-reflecting face in the vicinity of a forming position of the linear image and deflecting a reflected light beam as a deflected light beam at an equal angular velocity;

an image forming mirror for converging the deflected light beam onto a scanned face; and optical path separating means for separating an optical path of the light beam reflected on this image forming mirror from an incident optical path from the light source device to the image forming mirror;

the image forming mirror being constructed by an image forming mirror for an equal speed optical scan in which the light beam deflected at the equal angular velocity and divergent with respect to the cross scan-corresponding direction is converged as a light spot onto the scanned face and a scanning speed of the light spot on the scanned face is equalized;

the image forming mirror having a reflecting face formed in concave and aspherical shapes;

the reflecting face being obtained by rotating a curve X(H) represented by the following formula, $$X(H)=CH^2/[1+\sqrt{\{1-(1+K)C^2H^2\}}]+\Sigma A_i \cdot H^{**i}$$

around an axis parallel to an H-axis where the variable Ai is an aspherical coefficient and i is a whole number; and the curve X(H) being set such that a value ΔX(H) defined by $$\Delta X(H)=X(H)-C'H^2/[1+\sqrt{\{1-C'^2H^2\}}]$$

satisfies the following condition (I), $$-3.0\times10^{-5} < \Delta X(H=0.1f)/f < 3.0\times10^{-5} \quad (I)$$

when $C'=C+2A_2$ and f is set to a focal length of the reflecting face on an X-H face.

In accordance with a ninth construction of the present invention, the above fifth object can be also achieved by the optical scanner having the eighth construction in which the optical scanner further comprises a cylindrical optical element arranged between the optical deflector and the image forming mirror and having refracting power only in the cross scan-corresponding direction.

In accordance with a tenth construction of the present invention, the above fifth object can be also achieved by the optical scanner having the eighth or ninth construction in which the light beam incident to the deflecting-reflecting face of the optical deflector is convergent in the main scan-corresponding direction.

In accordance with an eleventh construction of the present invention, the above fifth object can be also achieved by the optical scanner having the eighth or ninth construction in which the light beam incident to the deflecting-reflecting face of the optical deflector is divergent in the main scan-corresponding direction.

In accordance with a twelfth construction of the present invention, the above fifth object can be also achieved by the optical scanner having the eighth or ninth construction in which the light beam emitted from the light source device is a parallel light beam.

As mentioned above, the first object can be achieved by the first construction of the present invention so that field curvature is preferably corrected and an optical scanning operation is preferably performed at an equal speed.

The second object can be achieved by each of the second, fourth and sixth constructions of the present invention so that an optical scanning operation is preferably performed at an equal speed and a diameter of the light spot is stabilized.

The third object can be achieved by each of the third, fifth and sixth constructions of the present invention so that an optical scanning operation is preferably performed at an equal speed and a diameter of the light spot is stabilized and a deflecting face inclination of the optical deflector can be corrected.

The fourth object can be achieved by the seventh construction of the present invention so that field curvature is preferably corrected and an optical scanning operation is preferably performed at an equal speed and a deflecting face inclination of the optical deflector can be corrected.

The fifth object can be achieved by each of the eighth to twelfth constructions of the present invention so that an optical scanning operation is preferably performed at an equal speed and a diameter of the light spot is stabilized and a deflecting face inclination of the optical deflector can be corrected.

Further objects and advantages of the present invention will be apparent from the following description of the preferred embodiments of the present invention as illustrated in the accompanying drawings.

Figure 14:
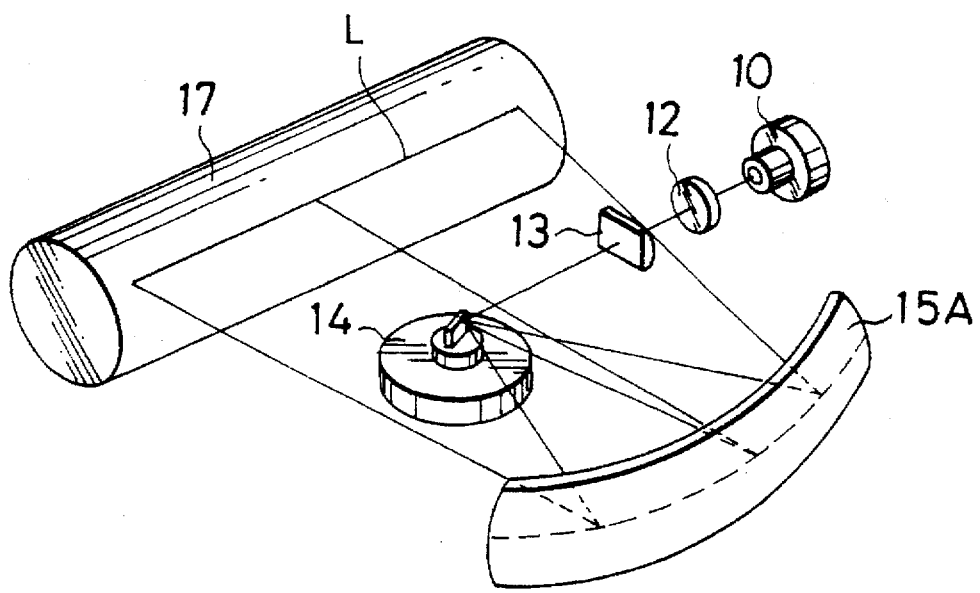
FIG. 14 is a view for explaining an optical scanner having an eighth construction of the present invention in accordance with one embodiment of the present invention.
Figure 15A:
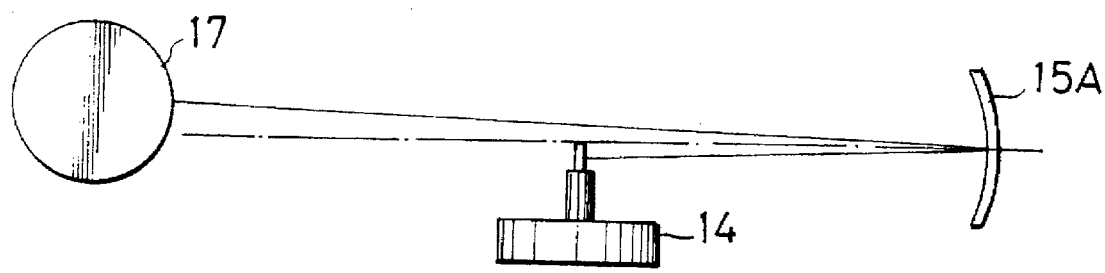
Figure 15B:
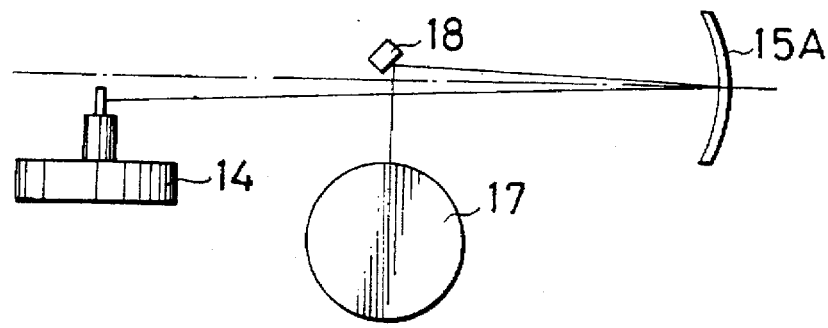
Figure 15C:
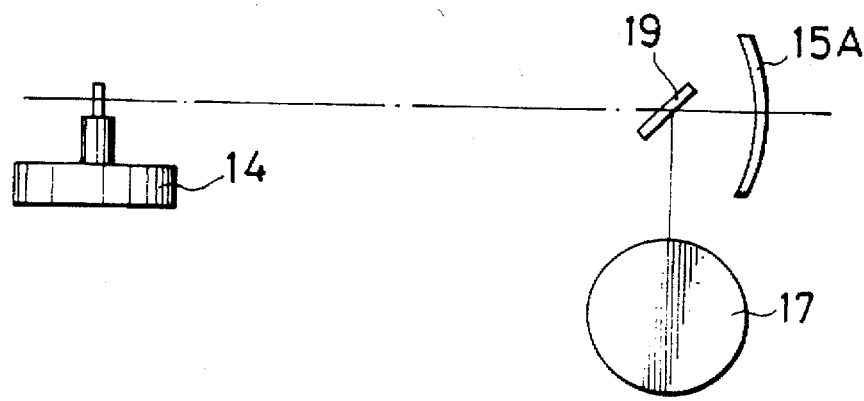
Figure 16A:
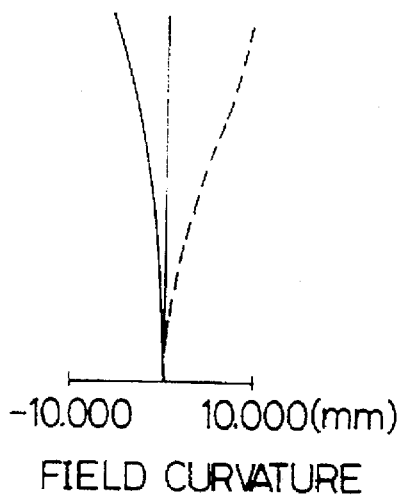
Figure 16B:
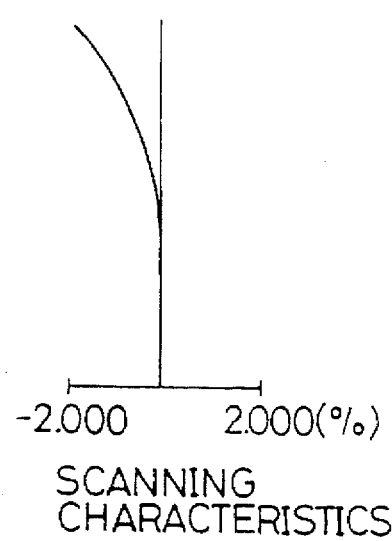
Figure 17A:
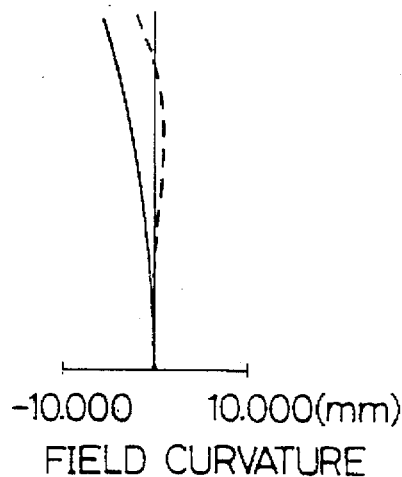
Figure 17B:
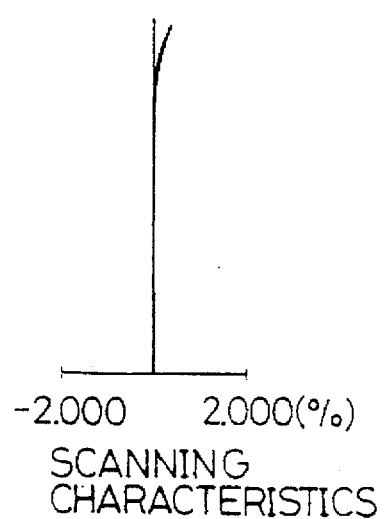
Figure 18A:
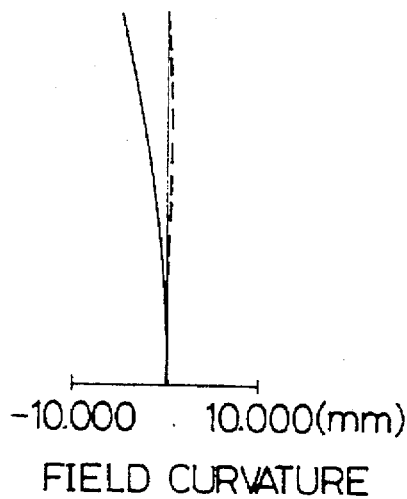
Figure 18B:
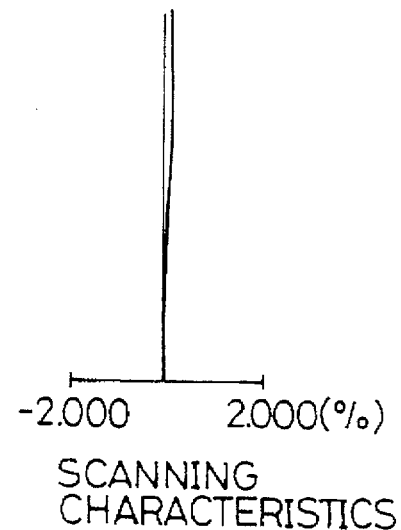
Figure 19A:
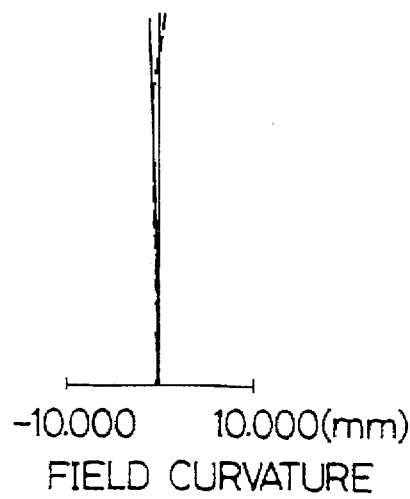
Figure 19B:
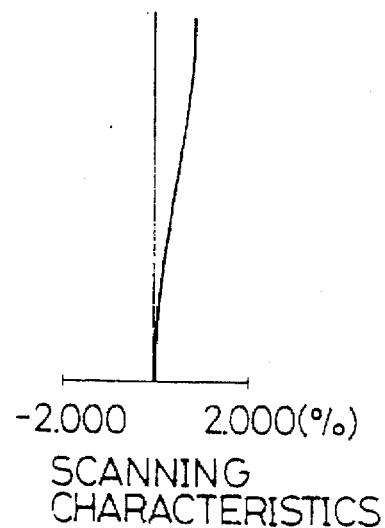
Figure 20A:
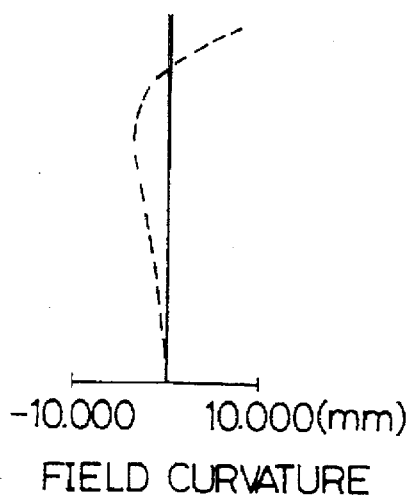
Figure 20B:
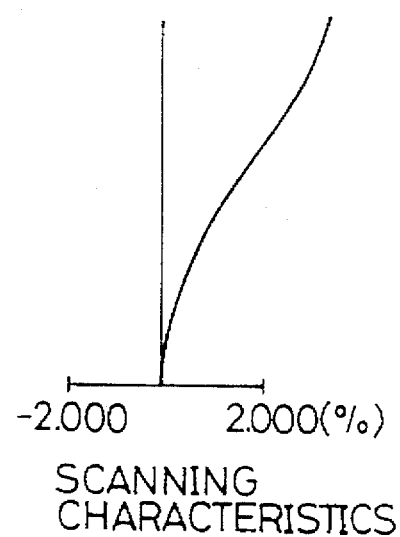
Figure 21A:
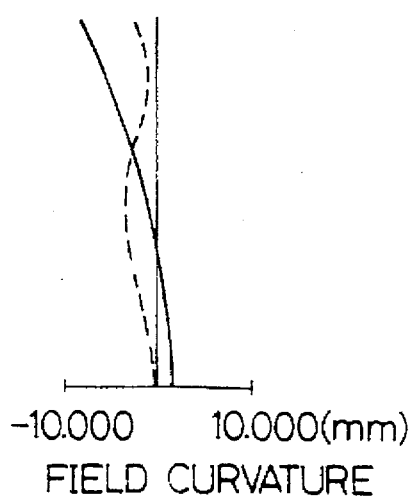
Figure 21B:
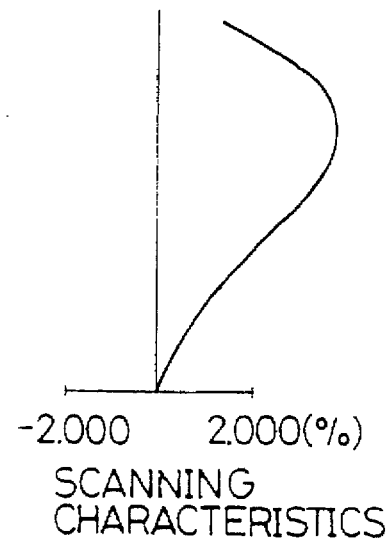
Figure 22A:
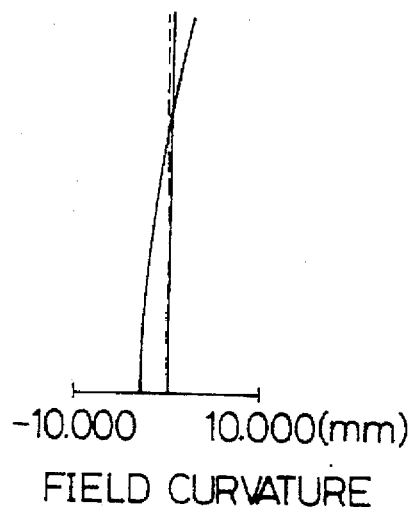
Figure 22B:
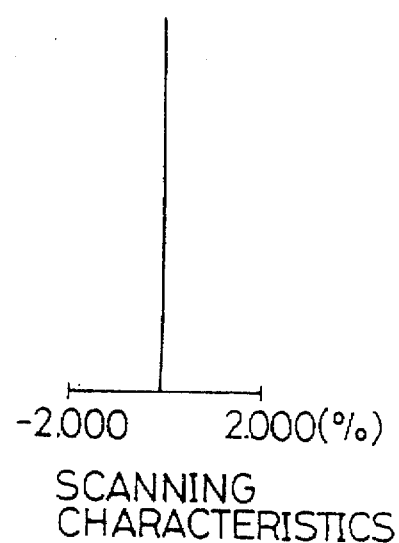
Figure 23A:
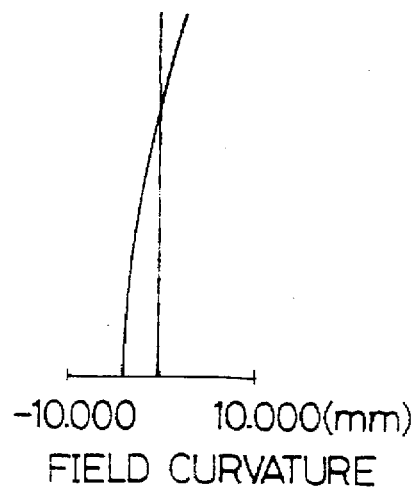
Figure 23B:
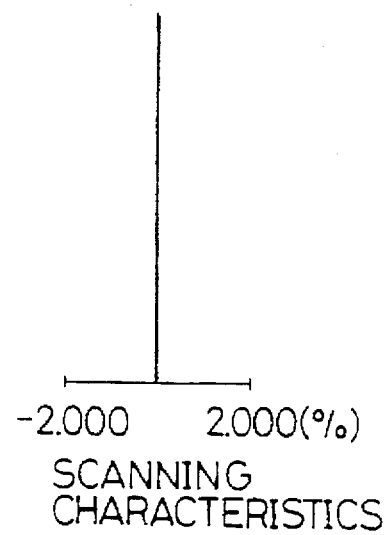
Figure 24:
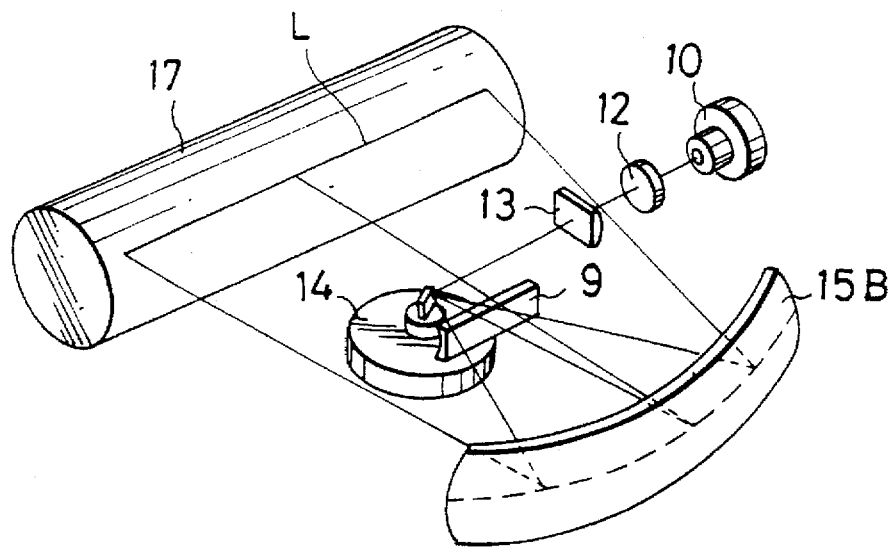
Figure 25:
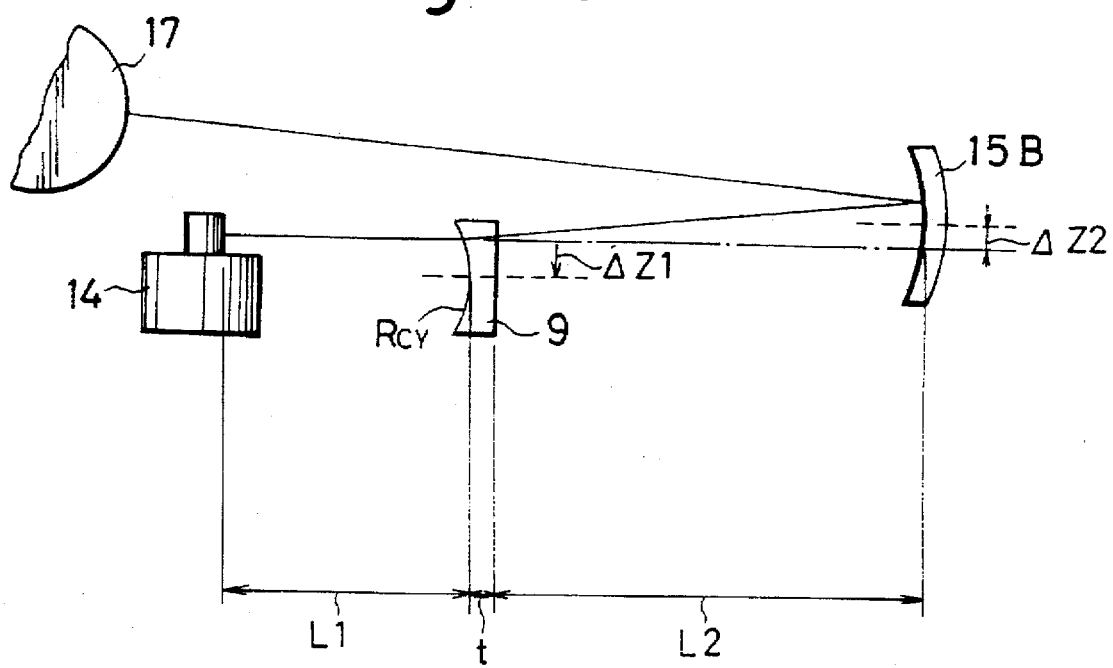
Figures 26A, 26B, 26C:
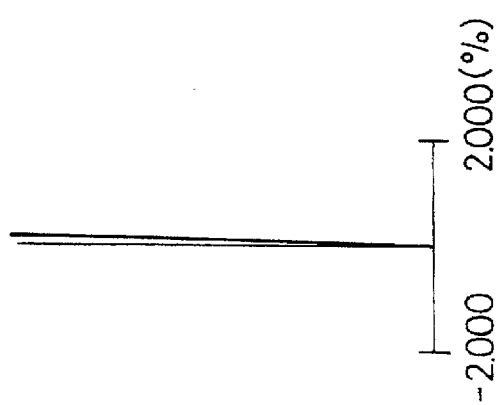
Figure 27A:
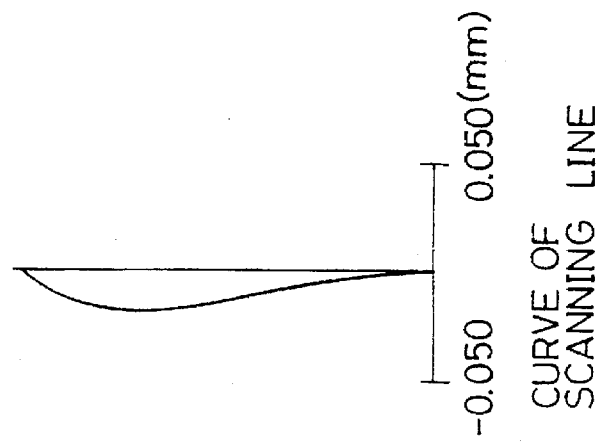
Figure 27B:
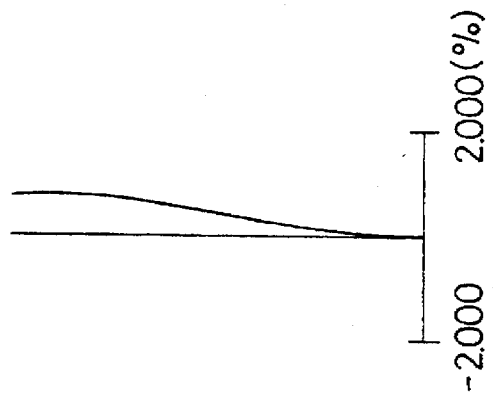
Figure 27C:
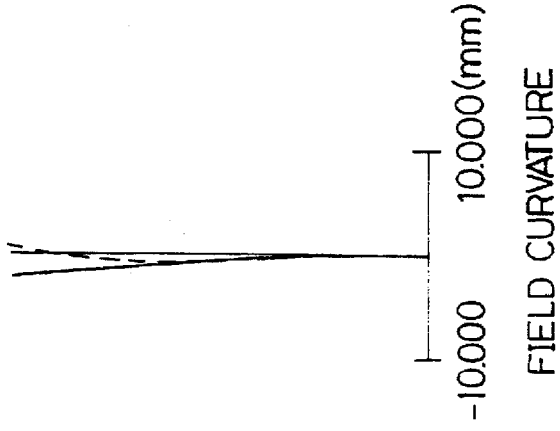
Figure 29:
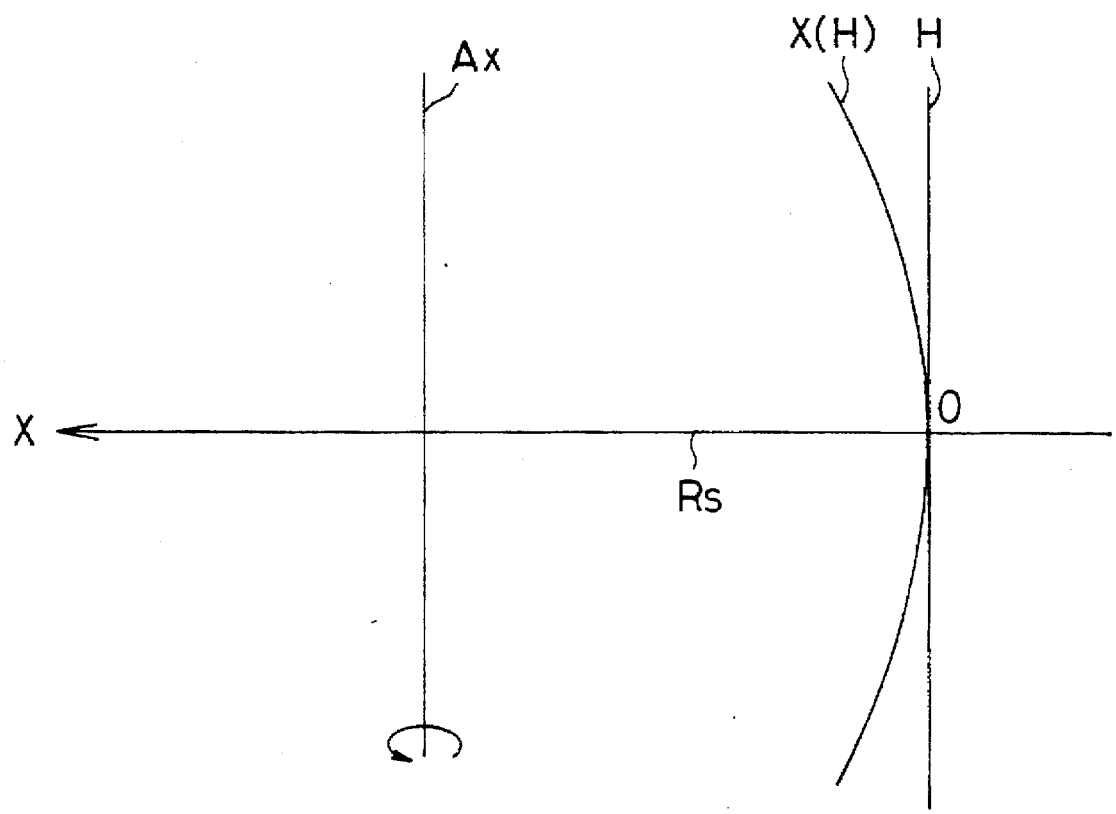

each of FIGS. 15a to 15c is a view for explaining an optical path separating means by an optical arrangement from an optical deflector to a scanned face;

FIGS. 16a and 16b are diagrams respectively showing field curvature and scanning characteristics of the optical scanner with respect to a concrete example 10 in the embodiment of FIG. 14;

FIGS. 17a and 17b are diagrams respectively showing field curvature and scanning characteristics of the optical scanner with respect to a concrete example 11 in the embodiment of FIG. 14;

FIGS. 18a and 18b are diagrams respectively showing field curvature and scanning characteristics of the optical scanner with respect to a concrete example 12 in the embodiment of FIG. 14;

FIGS. 19a and 19b are diagrams respectively showing field curvature and scanning characteristics of the optical scanner with respect to a concrete example 13 in the embodiment of FIG. 14;

FIGS. 20a and 20b are diagrams respectively showing field curvature and scanning characteristics of the optical scanner with respect to a concrete example 14 in the embodiment of FIG. 14;

FIGS. 21a and 21b are diagrams respectively showing field curvature and scanning characteristics of the optical scanner with respect to a concrete example 15 in the embodiment of FIG. 14;

FIGS. 22a and 22b are diagrams respectively showing field curvature and scanning characteristics of the optical scanner with respect to a concrete example 16 in the embodiment of FIG. 14;

FIGS. 23a and 25b are diagrams respectively showing field curvature and scanning characteristics of the optical scanner with respect to a concrete example 17 in the embodiment of FIG. 14;

FIG. 24 is a view for explaining an optical scanner having a ninth construction of the present invention in accordance with one embodiment of the present invention;

FIG. 25 is a view for explaining an optical arrangement from an optical deflector to a photosensitive body in FIG. 24;

FIGS. 26a, 26b and 26c are diagrams respectively showing field curvature, scanning characteristics and a scanning line curve of the optical scanner with respect to a concrete example 18 in the embodiment of FIG. 24;

FIGS. 27a, 27b and 27c are diagrams respectively showing field curvature, scanning characteristics and a scanning line curve of the optical scanner with respect to a concrete example 19 in the embodiment of FIG. 24;

FIGS. 28a, 28b and 28c are diagrams respectively showing field curvature, scanning characteristics and a scanning line curve of the optical scanner with respect to a concrete example 20 in the embodiment of FIG. 24: and FIG. 29 is a view for explaining the shape of a reflecting face of an image forming mirror for an equal speed optical scan having a seventh construction of the present invention.

DESCRIPTION OF THE PREFERRED EMBODIMENTS

The preferred embodiments of an image forming mirror for an equal speed optical scan and an optical scanner in the present invention will next be described in detail with reference to the accompanying drawings.

In an image forming mirror for an equal speed optical scan having a first construction of the present invention, a light beam deflected at an equal angular velocity is converged onto a scanned face and a scanning speed of a light spot on the scanned face is equalized.

The above image forming mirror for an equal speed optical scan has a reflecting face formed in coaxial, aspherical and concave shapes.

This reflecting face is obtained by rotating a curve X(H) represented by the following well-known formula relative to an aspherical surface around an X-axis.

$$X(H)=CH^2/[1+\sqrt{\{1-(1+K)C^2H^2\}}]+\Sigma A_i \cdot H^{**i} \quad (1)$$

In this formula, H**i means i-th power of H where the variable Ai is an aspherical coefficient and i is a whole number.

As is well-known, a constant C gives curvature (an inverse number of a radius of curvature) on an optical axis on the reflecting Face formed in such coaxial and aspherical shapes. A variable H gives a distance from the optical axis in a direction perpendicular to the optical axis.

The above curve X(H) specifying the coaxial and aspherical shapes of the concave reflecting face is set such that a value ΔX(H) defined by $$\Delta X(H)=X(H)-C'H^2/[1+\sqrt{\{1-C'^2H^2\}}]$$

satisfies the following condition (I), $$-3.0\times10^{-5}<\Delta X(H=0.1f)/f<3.0\times10^{-5} \quad (I)$$

when C'=C+2A$_2$ and f is set to a focal length of the reflecting face. In this case, ΔX(H) is a shift of the coaxial aspherical surface from a paraxial curvature face. ΔX(H=0.1f) is a value of ΔX(H) in a position in which a distance H of the reflecting face from the optical axis is equal to 0.1f.

An optical scanner having a second construction of the present invention has a light source device, an optical deflector, an image forming mirror and an optical path separating means.

The light source device emits a light beam for an optical scan. For example, the light source device can be constructed by combining a laser diode (LD) light source and a coupling lens with each other.

The optical deflector reflects the light beam from the light source device on a deflecting-reflecting face and deflects the light beam as a deflected light beam at an equal angular velocity. The optical deflector can be constructed by using a well-known rotary polygon mirror, a rotary dihedral mirror or a rotary unifacial mirror such as a pyramidal mirror, a tenon type mirror, etc.

The image forming mirror converges the deflected light beam as a light spot onto a scanned face and performs an optical scanning operation using the light spot at an equal speed. This image forming mirror is constructed by the image forming mirror for an equal speed optical scan having the first construction.

The optical path separating means separates an optical path of the light beam reflected on the image forming mirror from an incident optical path from the light source device to the image forming mirror.

An optical scanner having a third construction of the present invention has a light source device, a linear image forming optical system, an optical deflector, an image forming mirror, an optical path separating means and an elongated toroidal lens.

The light source device, the optical deflector and the optical path separating means are similar to those in the optical scanner having the second construction.

The linear image forming optical system converges the light beam from the light source device in a cross scan-corresponding direction and focuses and forms this light beam as a linear image extending in a main scan-corresponding direction in a position in the vicinity of a deflecting-reflecting face of the optical deflector. In this case, the main scan-corresponding direction is set to a direction corresponding and parallel to a main scanning direction on a virtual optical path provided by linearly developing an optical path from a light source to a scanned face. The cross scan-corresponding direction is set to a direction corresponding and parallel to a cross scanning direction on this virtual optical path.

The image forming mirror is constructed by the image forming mirror for an equal speed optical scan having the first construction. However, in the optical scanner having the second construction, the image forming mirror for an equal speed optical scan independently converges the deflected light beam as a light spot onto the scanned face. In contrast to this, in the optical scanner having the third construction, the image forming mirror for an equal speed optical scan having the first construction converges the deflected light beam as a light spot onto the scanned face in cooperation with an elongated toroidal lens.

The elongated toroidal lens extends in the main scan-corresponding direction and is arranged on an optical path from the image forming mirror toward the scanned face. The elongated toroidal lens converges the deflected light beam as a light spot onto the scanned face in cooperation with the image forming mirror. The elongated toroidal lens has a barrel type toroidal face as a concave lens face formed such that this barrel type toroidal face is obtained by rotating a curve having an aspherical shape around an axis parallel to the main scan-corresponding direction and has a radius of curvature reduced in the cross scan-corresponding direction as the barrel type toroidal face is separated from an optical axis thereof in a main scanning direction. This curve is generally represented by the above-mentioned formula (1). The elongated toroidal lens has a normal toroidal face as a convex lens face.

In accordance with a fourth construction of the present invention, the light beam incident to the deflecting-reflecting face of the optical deflector is convergent or divergent in the optical scanner having the second construction. In accordance with a fifth construction of the present invention, the light beam incident to the deflecting-reflecting face is convergent or divergent with respect to the main scan-corresponding direction in the optical scanner having the third construction. In accordance with a sixth construction of the present invention, the light beam emitted from the light source device is a parallel light beam in the optical scanner having the second or third construction.

In an image forming mirror for an equal speed optical scan having a seventh construction of the present invention, a light beam deflected at an equal angular velocity and divergent with respect to a cross scan-corresponding direction is converged as a light spot onto a scanned face and a scanning speed of the light spot on the scanned face is equalized.

The image forming mirror has a reflecting face formed in concave and aspherical shapes.

The reflecting face is obtained by rotating a curve $X(H)$ represented by the following formula, $$X(H)=CH^2/[1+\sqrt{1-(1+K)C^2H^2}]+\Sigma A_i \cdot H^{**i} \qquad (1)$$

around an axis parallel to an H-axis where the variable $A_i$ is an aspherical coefficient and i is a whole number.

The above curve $X(H)$ is set such that a value $\Delta X(H)$ defined by $$\Delta X(H)=X(H)-C'H^2/[1+\sqrt{1-C'^2H^2}]$$

satisfies the following condition (I), $$-3.0\times10^{-5}<\Delta X(H=0.1f)/f<3.0\times10^{-5} \qquad (I)$$

when $C'=C+2A_2$ and f is set to a focal length of the reflecting face on an X-H face.

Namely, the shape of the reflecting face of the image forming mirror for an equal speed optical scan having each of the first and seventh constructions is determined by the curve $X(H)$ satisfying the above condition (I) and prescribed by the formula (1). The image forming mirror for an equal speed optical scan having the first construction has a coaxial aspherical surface obtained by rotating the above curve $X(H)$ around an X-axis. In contrast to this, the image forming mirror for an equal speed optical scan having the seventh construction has a concave aspherical surface formed by rotating the curve $X(H)$ around an axis parallel to the H-axis. Therefore, the image forming mirror for an equal speed optical scan having the seventh construction constitutes an anamorphic image forming system saving different refracting powers in the main scan-corresponding direction and the cross scan-corresponding direction.

An optical scanner having the eighth construction of the present invention has a light source device, a linear image forming optical system, an optical deflector, an image forming mirror and an optical path separating means.

The light source device emits a light beam for an optical scan. For example, the light source device can be constructed by combining a laser diode (LD) light source and a coupling lens with each other.

The linear image forming optical system converges the light beam from the light source device in a cross scan-corresponding direction and focuses and forms this light beam as a linear image extending in a main scan-corresponding direction. The linear image forming optical system can be constructed by using a cylindrical optical system such as a cylindrical lens, a cylindrical mirror, etc.

The optical deflector has a deflecting-reflecting face in the vicinity of a forming position of the above linear image. The optical deflector reflects the light beam from the light source device on the deflecting-reflecting face. The optical deflector then deflects the reflected light beam as a deflected light beam at an equal angular velocity. The optical deflector can be constructed by using a well-known rotary polygon mirror, a rotary dihedral mirror or a rotary unifacial mirror such as a pyramidal mirror, a tenon type mirror, etc.

The image forming mirror converges the deflected light beam as a light spot onto a scanned face and performs an optical scanning operation using the light spot at an equal speed. The image forming mirror is constructed by the above image forming mirror for an equal speed optical scan having the seventh construction of the present invention.

The optical path separating means separates an optical path of the light beam reflected on the image forming mirror from an incident optical path from the light source device to the image forming mirror.

An optical scanner having a ninth construction of the present invention has a cylindrical optical element arranged between the optical deflector and the image forming mirror and having refracting power only in the cross scan-corresponding direction in the eighth construction.

In accordance with a tenth, eleventh or twelfth construction of the present invention, the light beam emitted from the light source device is respectively set to a convergent, divergent or parallel light beam in the optical scanner having the eighth or ninth construction.

The reflecting face has an aspherical shape in the image forming mirror for an equal speed optical scan having each of the first and seventh constructions. Accordingly, field curvature in the main scanning direction can be preferably corrected by using this aspherical shape.

The condition (I) in the first and seventh constructions of the present invention is a condition for preferably correcting field curvature in the main scanning direction and scanning characteristics.

The scanning characteristics show an equal speed property of the optical scanning operation relative to the above-mentioned linearity. The scanning characteristics are defined by $[\{Hr(\theta)/Hi(\theta)\}-1] \times 100$ (%) when the height of an ideal image of the light spot is set to $Hi(\theta)$ and a height of the real image is set to $Hr(\theta)$ at an angle $\theta$ of deflection. The scanning characteristics correspond to $f\theta$ characteristics defined with respect to an $f\theta$ lens.

When $\Delta X$ in the condition (I) exceeds a lower limit thereof, curvature of the reflecting face is increased as the reflecting face is separated from the optical axis. In this case, the curvature of the reflecting face is equal to curvature in the main scan-corresponding direction in the image forming mirror for an equal speed optical scan having the seventh construction. In the image forming mirror for an equal speed optical scan having the seventh construction, the curvature in the main scan-corresponding direction is increased as the reflecting face is separated from the optical axis in an H-axis direction. Field curvature in the main scanning direction is excessively increased on a plus (under) side and the scanning characteristics are excessively increased on a minus (under) side.

In contrast to this, when $\Delta X$ in the condition (I) exceeds an upper limit thereof, the above curvature of the reflecting face is decreased as the reflecting face is separated from the optical axis. Accordingly, both the field curvature in the main scanning direction and the scanning characteristics are excessively increased.

In a range outside the condition (I), a distance from the image forming mirror for an equal speed optical scan to the scanned face is reduced so that the layout of an optical system is strictly restrained.

In the optical scanner having the third construction, the light beam for an optical scan from the light source device is focused and formed as a linear image extending in the main scan-corresponding direction in the vicinity of the deflecting-reflecting face. The deflected light beam is converged as a light spot onto the scanned face by the image forming mirror for an equal speed optical scan and the elongated toroidal lens. Accordingly, an inclination of the deflecting-reflecting face is automatically corrected.

Further, field curvature in the cross scanning direction can be preferably corrected by optimizing a shape of the barrel type toroidal face of the elongated toroidal lens so that the scanning characteristics can be more preferably corrected.

The image forming mirror for an equal speed optical scan having the seventh construction constitutes an anamorphic image forming system having different mirror shapes in the main and cross scan-corresponding directions. Accordingly, an inclination of the deflecting-reflecting face can be automatically corrected by using this image forming mirror in the optical scanner having each of the eighth to twelfth constructions.

Concrete embodiments of the present invention will next be explained.

Figure 1:
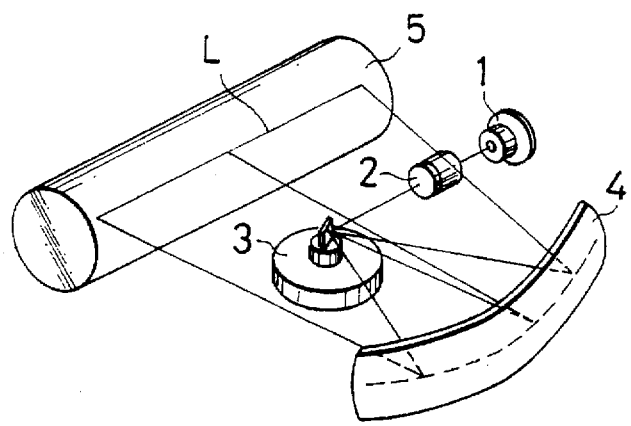
FIG. 1 is a view for explaining an optical scanner having a second construction of the present invention in accordance with one embodiment of the present invention; each of FIGS. 2a to 2c is a view for explaining an optical path separating means by an optical arrangement from an optical deflector to a scanned face.

FIG. 1 shows an optical scanner having a second construction of the present invention in accordance with one embodiment of the present invention. In FIG. 1, a divergent light beam is emitted from a semiconductor laser as a light source 1 and is transmitted through a coupling lens 2. The coupling lens 2 may be constructed such that the light beam transmitted through this coupling lens 2 is set to a convergent light beam, a divergent light beam or a substantially parallel light beam. The light source 1 and the coupling lens 2 constitute a light source device.

The light beam emitted from the light source device is reflected on a deflecting-reflecting face of an optical deflector 3 as a tenon type dihedral mirror. This light beam is then incident to an image forming mirror 4 for an equal speed optical scan and is reflected on this image forming mirror 4. The reflected light beam is converged as a light spot on a photoconductive photosensitive body 5 arranged such that a generating line of this photoconductive photosensitive body 5 is in conformity with a main scanning line L on a scanned face. The photosensitive body 5 is optically scanned at an equal speed as the light beam is deflected by the optical deflector 3 at an equal angular velocity. The optical deflector can be constructed by using each of a tenon type mirror, a pyramidal mirror or a rotary polygon mirror in addition to the tenon type dihedral mirror.

Figure 2A:
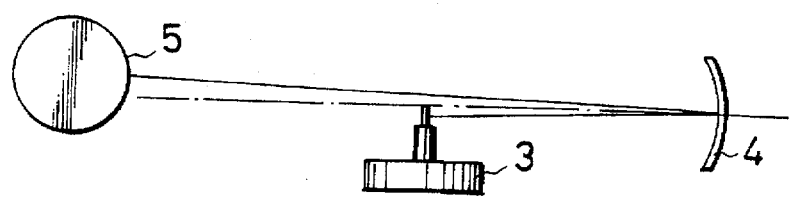
Figure 2B:
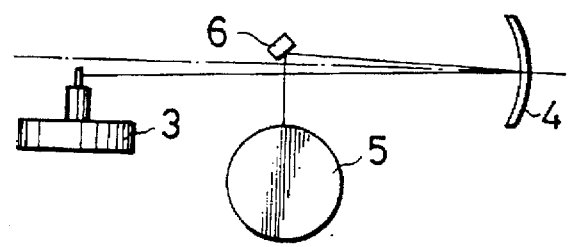
Figure 2C:
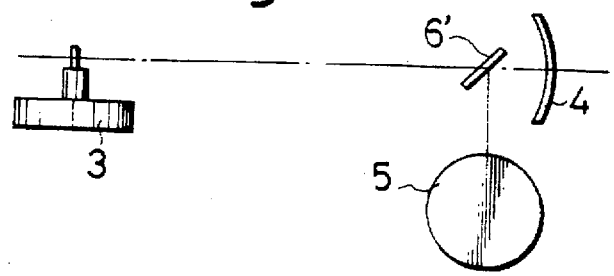
Figure 3A:
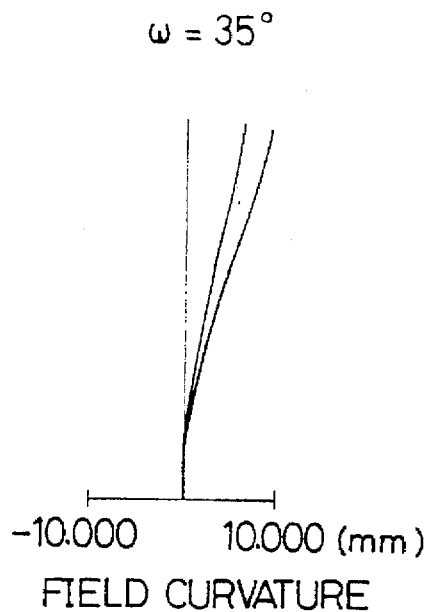
FIGS. 3a and 3b are diagrams respectively showing field curvature and scanning characteristics of the optical scanner with respect to a concrete example 1 in the embodiment of FIG. 1.
Figure 3B:
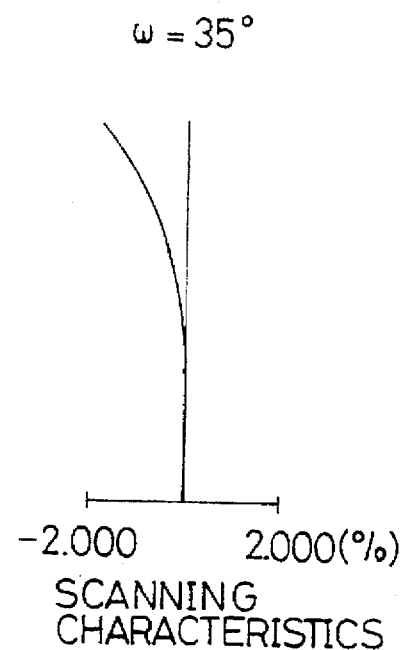
Figure 4A:
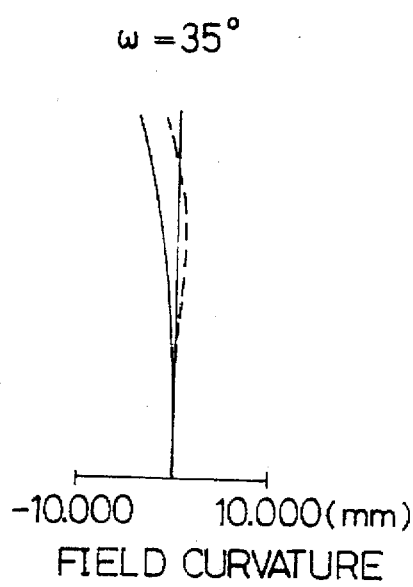
FIGS. 4a and 4b are diagrams respectively showing field curvature and scanning characteristics of the optical scanner with respect to a concrete example 2 in the embodiment of FIG. 1.
Figure 4B:
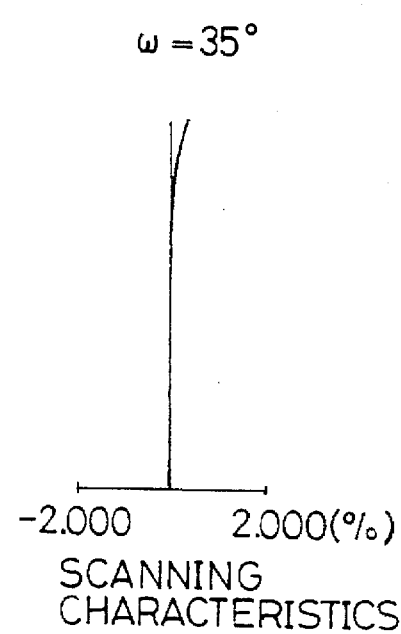
Figure 5A:
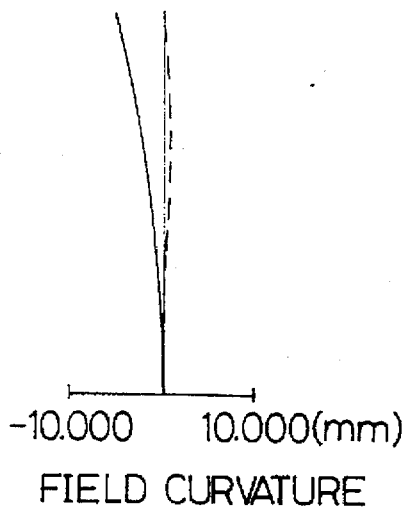
FIGS. 5a and 5b are diagrams respectively showing field curvature and scanning characteristics of the optical scanner with respect to a concrete example 3 in the embodiment of FIG. 1.
Figure 5B:
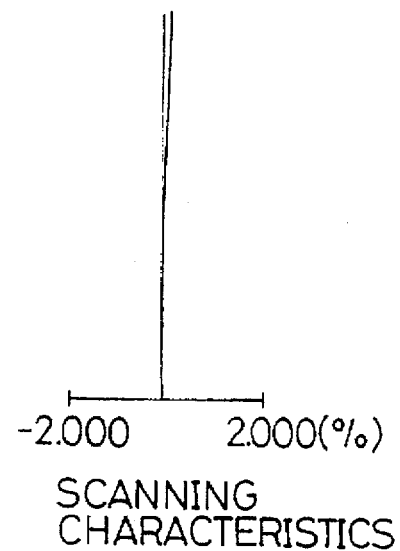
Figure 6A:
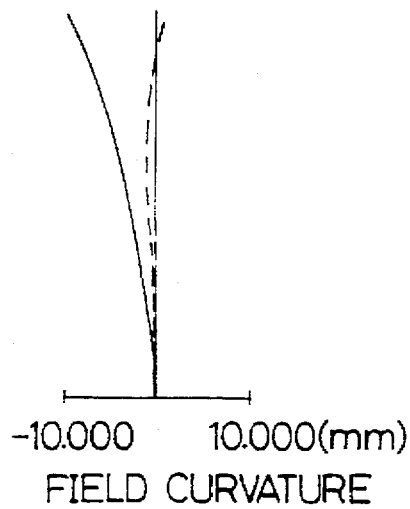
FIGS. 6a and 6c are diagrams respectively showing field curvature and scanning characteristics of the optical scanner with respect to a concrete example 4 in the embodiment of FIG. 1.
Figure 6C:
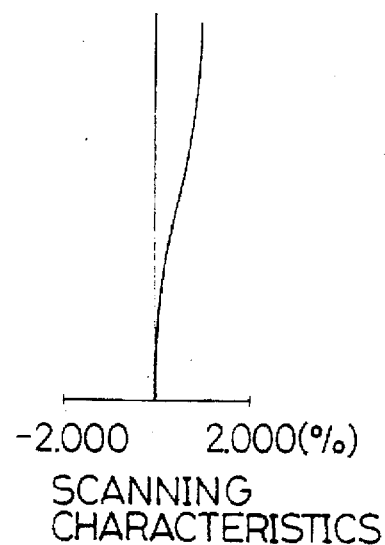
Figure 7A:
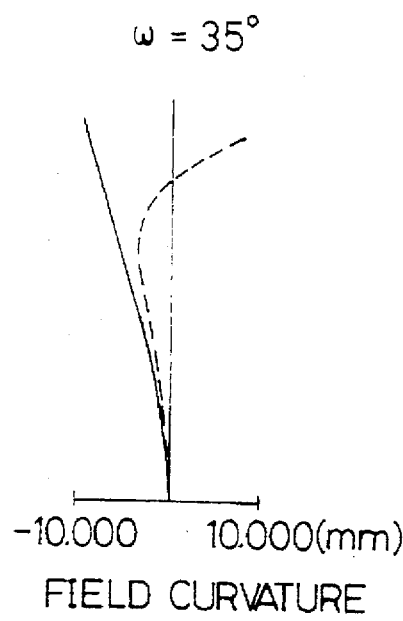
FIGS. 7a and 7b are diagrams respectively showing field curvature and scanning characteristics of the optical scanner with respect to a concrete example 5 in the embodiment of FIG. 1.
Figure 7B:
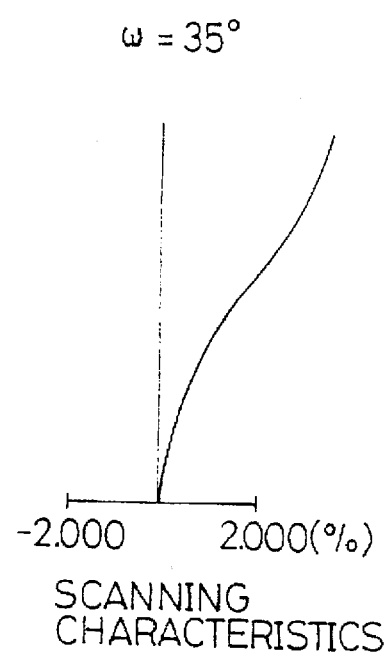
Figure 8A:
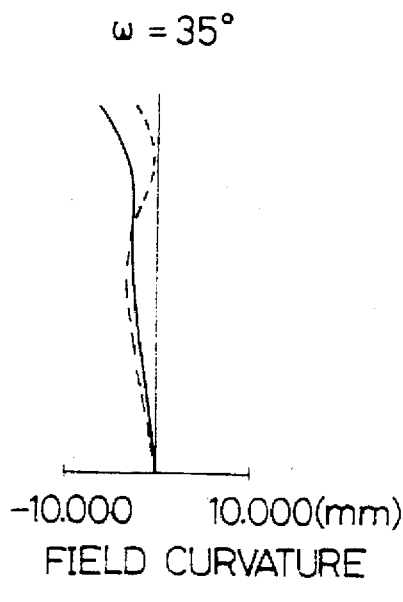
FIGS. 8a and 8b are diagrams respectively showing field curvature and scanning characteristics of the optical scanner with respect to a concrete example 6 in the embodiment of FIG. 1.
Figure 8B:
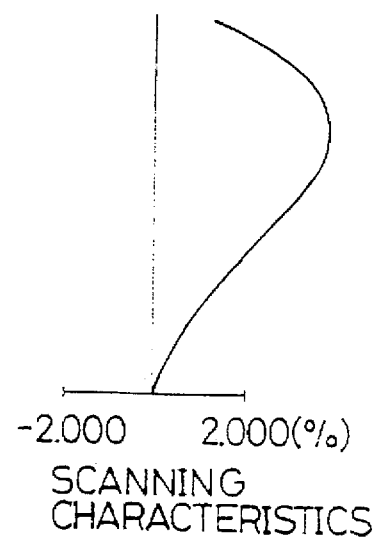

In the optical scanner using the image forming mirror for an equal speed optical scan, the deflected light beam is reflected on an incident side by the image forming mirror for an equal speed optical scan. Accordingly, it is necessary to arrange an optical path separating means for separating an optical path of the reflected light beam from an optical path of the incident light beam. It is possible to use various kinds of methods for separating these optical paths from each other. FIGS. 2a to 2c show three typical examples of these methods.

Each of FIGS. 2a and 2b shows an optical path separating system in which a light beam incident to the image forming mirror 4 for an equal speed optical scan is inclined in a cross scan-corresponding direction set to a vertical direction in these figures. In FIG. 2a, the light beam reflected on the image forming mirror 4 for an equal speed optical scan is directly incident to the photosensitive body 5. This optical path separating system shown in FIG. 2a is used in the optical scanner shown in FIG. 1. In contrast to this, in FIG. 2b, an optical path of the reflected light beam is bent by an elongated mirror 6 so as to guide the light beam to a photosensitive body 5. FIG. 2c shows an optical path separating system using an elongated half mirror 6'.

In the example of FIG. 2a, the optical path separating means is constructed by inclining the light beam incident to the image forming mirror 4 for an equal speed optical scan in the cross scan-corresponding direction. In the example of FIG. 2b, the optical path separating means is constructed by inclining the incident light beam as mentioned above and using the elongated mirror 6. In the example of FIG. 2c, the optical path separating means is constructed by using the elongated half mirror 6'.

Six concrete examples of the optical arrangement with respect to the optical scanner shown in FIG. 1 will next be explained.

In each of these concrete examples, the shape of a reflecting face of the image forming mirror 4 for an equal speed optical scan is specified by giving a radius R of curvature on an optical axis of this mirror 4, a conical constant K and aspherical coefficients $A_4$, $A_6$, $A_8$ and $A_{10}$. The radius R Of curvature is equal to an inverse number of C in the above formula (1). C' in the condition (I) is equal to C since the aspherical coefficient $A_2$ is equal to zero.

$S_0$ shows the position of an object point in image formation using the image forming mirror 4 for an equal speed optical scan when an angle of deflection is equal to zero. Namely, $S_0$ shows a distance from the reflecting face. $S_0$ is set to be negative when the object point is located on this side with respect to the reflecting face as a light source side on an optical path. $L_0$ shows a distance from the deflecting-reflecting face to the reflecting face of the image forming mirror 4 for an equal speed optical scan when the angle of deflection is equal to zero.

As mentioned above, the light beam for an optical scan emitted from the light source device is set to a convergent, divergent or parallel light beam. Accordingly, when $S_0$ is negative, the light beam emitted from the light source device is equal to a divergent or convergent light beam. Accordingly, there is a case in which the light beam is converged in front of the image forming mirror 4 for an equal speed optical scan. In contrast to this, when $S_0$ is positive, the light beam emitted from the light source device is set to a convergent light beam. In this case, a natural converging position is located behind the image forming mirror 4 for an equal speed optical scan. The natural converging position is a position in which the light beam is naturally converged when there is no image forming mirror 4 for an equal speed optical scan on the optical path. $S_0$ is equal to be infinite ($\infty$) when the light beam emitted from the light source device is set to a parallel light beam.

A field angle is set to ±35 degrees in each of the concrete examples 1 to 6.

CONCRETE EXAMPLE 1

$S_0$=54.821, $L_0$=164.44,
R=−595.47, K=17.0. $A_4$=−7.63462×10$^{-10}$,
$A_6$=4.31645×10$^{-14}$, $A_8$=4.31794×10$^{-18}$,
$A_{10}$=9.5×10$^{-22}$

Parametric value in condition (I):

$\Delta X(H=0.1f)/f=-2.91\times 10^{-5}$

CONCRETE EXAMPLE 2

$S_0$=112.44, $L_0$=160.2,
R=−425.562, K=−1.533, $A_4$=5.1×10$^{-9}$,
$A_6$=−5.0876×10$^{-14}$, $A_8$=1.7162×10$^{-19}$,
$A_{10}$=3.077×10$^{-22}$ parametric value in condition (I):

$\Delta X(H=0.1f)/f=-2.54\times 10^{-6}$

CONCRETE EXAMPLE 3

$S_0$=141.22, $L_0$=163.68,
R=−442.06, K=1.0, $A_4$=−1.32×10$^{-10}$, parametric value in condition (I):

$\Delta X(H=0.1f)/f=-1.71\times 10^{-6}$

CONCRETE EXAMPLE 4

$S_0$=250.8, $L_0$=121.2,
R=−360.626, K=−3.44, $A_4$=−5.44171×10$^{-9}$,
$A_6$=−1.79832×10$^{-13}$, $A_8$=−6.90425×10$^{-18}$,
$A_{10}$=3.22688×10$^{-22}$ parametric value in condition (I):

$\Delta X(H=0.1f)/f=2.14\times 10^{-6}$

CONCRETE EXAMPLE 5

$S_0$=316.0016, $L_0$=129.7842,
R=−493.642, K=−10.0, $A_8$=−2.5417×10$^{-18}$,
$A_6$=−1.0703×10$^{-13}$, $A_8$=−6.08724×10$^{-18}$,
$A_{10}$=−5.5486×10$^{-22}$ parametric value in condition (I):

$\Delta X(H=0.1f)/f=1.16\times 10^{-5}$

CONCRETE EXAMPLE 6

$S_0$=40.0, $L_0$=220.0,
R=−400.0, K=−21.0, $A_4$=−7.20102×10$^{-9}$,
$A_6$=−1.32545×10$^{-13}$, $A_8$=−5.73894×10$^{-18}$,
$A_{10}$=−1.0×10$^{-21}$ parametric value in condition (I):

$\Delta X(H=0.1f)/f=2.63\times 10^{-5}$

FIGS. 3a to 8b respectively show field curvature and scanning characteristics of the optical scanner with respect to the above concrete examples 1 to 6. In these concrete examples 1 to 6, a broken line shows field curvature in a main scanning direction and a solid line shows field curvature in a cross scanning direction.

Figure 9:
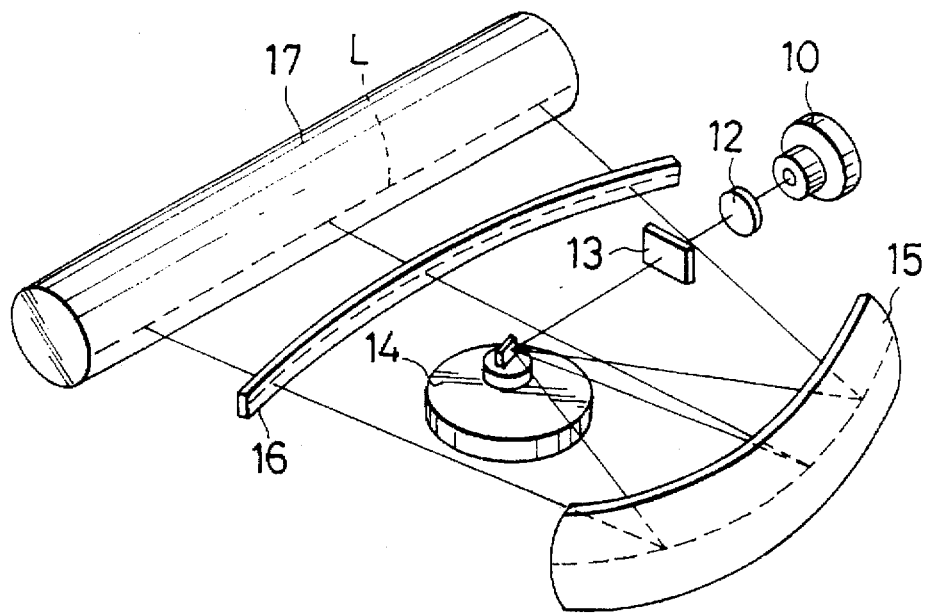
FIG. 9 is a view for explaining an optical scanner having a third construction of the present invention in accordance with one embodiment of the present invention.

FIG. 9 shows an optical scanner having a third construction of the present invention in accordance with one embodiment of the present invention.

In FIG. 9, a divergent light beam is emitted from a light source 10 constructed by a semiconductor laser and is transmitted through a coupling lens 12. In accordance with a fifth construction of the present invention, the coupling lens 12 changes the transmitted light beam to a convergent or divergent light beam. In accordance with a sixth construction of the present invention, the coupling lens 12 substantially changes the transmitted light beam to a parallel light beam. The light source 10 and the coupling lens 12 constitute a light source device.

The light beam emitted from the light source device is then transmitted through a cylindrical lens 13 as a linear image forming element and is converged only in a cross scan-corresponding direction. The light beam is thus formed as a linear image extending in a main scan-corresponding direction in the vicinity of a deflecting-reflecting face of an optical deflector 14 as a tenon type rotary dihedral mirror. The light beam reflected on the deflecting-reflecting face is further reflected on an image forming mirror 15 for an equal speed optical scan. This light beam is then converged as a light spot on a photoconductive photosensitive body 17 through an elongated toroidal lens 16. The photoconductive photosensitive body 17 is arranged such that a generating line of the photosensitive body 17 is in conformity with a main scanning line L on a scanned face. The photosensitive body 17 is optically scanned by the converged light beam at an equal speed as the light beam is deflected by the optical deflector 14 at an equal angular velocity.

An image forming action of the image forming mirror 15 for an equal speed optical scan and the elongated toroidal lens 16 will next be described with respect to each of the main scan-corresponding direction and the cross scan-corresponding direction. With respect to the main scan-corresponding direction, the light beam transmitted through the coupling lens 12 is converged by only the image forming mirror 15 for an equal speed optical scan as a light spot on the photosensitive body 17.

In contrast to this, with respect to the cross scan-corresponding direction, as mentioned above, an image formed by the image forming mirror 15 for an equal speed optical scan and the elongated toroidal lens 16 constitutes a light spot on the photosensitive body 17 in a state in which a linear image extending in the main scan-corresponding direction and focused and formed by the cylindrical lens 13 is provided as an object point.

This linear image is formed in the vicinity of the deflecting-reflecting face. Accordingly, with respect to the cross scan-corresponding direction, the image forming mirror 15 for an equal speed optical scan and the elongated toroidal lens 16 approximately set positions of the deflecting-reflecting face and a scanned face in a conjugate relation in geometrical optics. Similar to the embodiment shown in FIG. 1, an optical path separating means is constructed by inclining the light beam incident to the image forming mirror 15 for an equal speed optical scan in the cross scan-corresponding direction.

Figure 10:
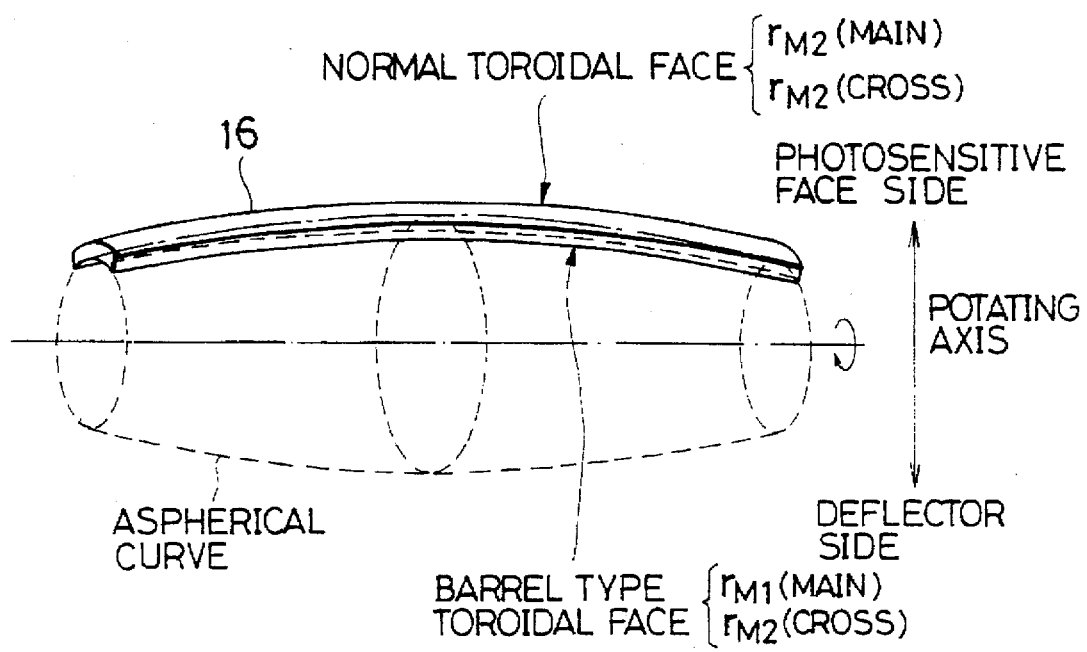
FIG. 10 is a view for explaining an elongated toroidal lens.
Figure 11A:
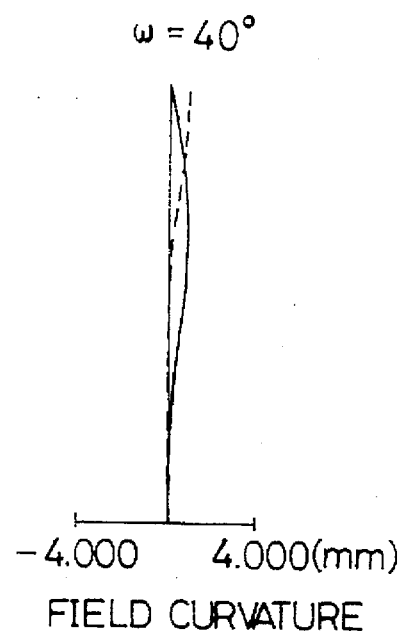
FIGS. 11a and 11b are diagrams respectively showing field curvature and scanning characteristics of the optical scanner with respect to a concrete example 7 in the embodiment of FIG. 9.
Figure 11B:
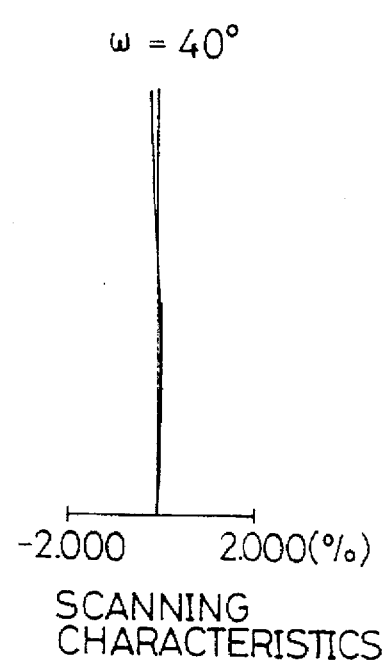
Figure 12A:
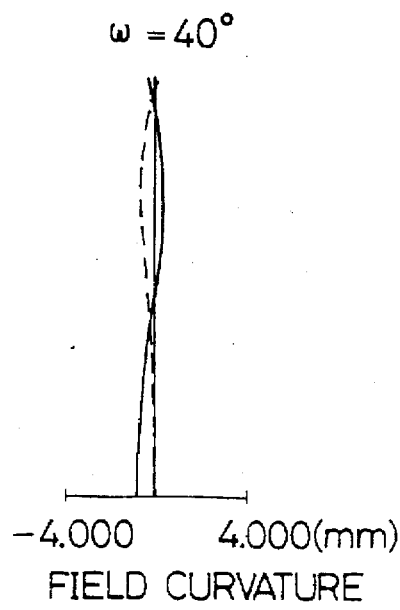
FIGS. 12a and 12b are diagrams respectively showing field curvature and scanning characteristics of the optical scanner with respect to a concrete example 8 in the embodiment of FIG. 9.
Figure 12B:
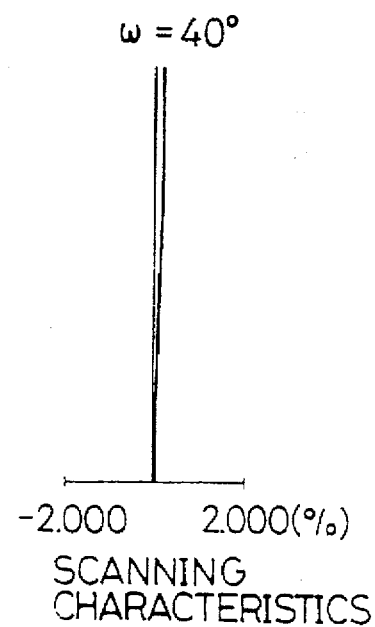
Figure 13A:
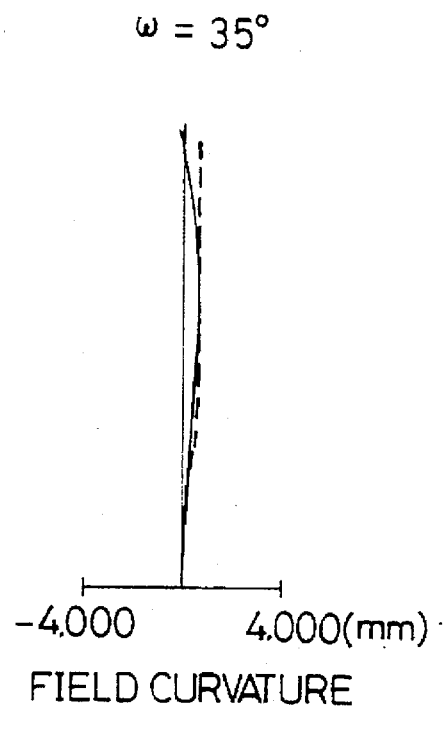
FIGS. 13a and 13b are diagrams respectively showing field curvature and scanning characteristics of the optical scanner with respect to a concrete example 9 in the embodiment of FIG. 9.
Figure 13B:
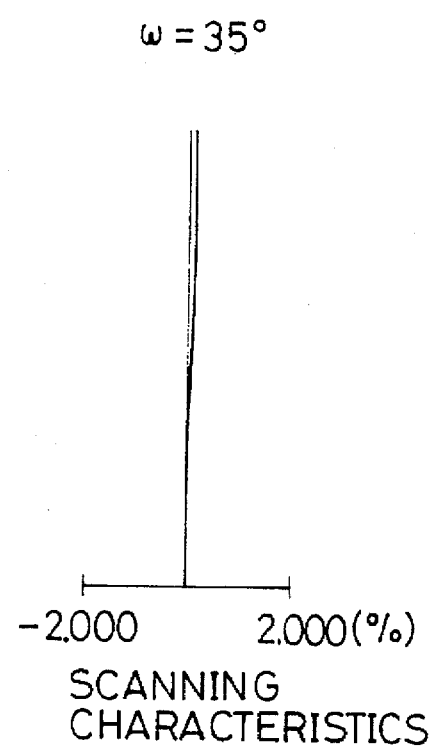

FIG. 10 is a view for explaining the elongated toroidal lens 16. As mentioned above, the elongated toroidal lens 16 extends in the main scan-corresponding direction and is arranged on an optical path from the image forming mirror 15 for an equal speed optical scan toward the scanned face. The elongated toroidal lens 16 has a normal toroidal face as a convex lens face as shown in FIG. 10. This normal toroidal face of the elongated toroidal lens 16 is arranged on a side of the photosensitive body 17. Namely, this normal toroidal face is arranged toward a scanned face side.

A concave face of the elongated toroidal lens 16 on a side of the image forming mirror 15 for an equal speed optical scan is obtained by rotating a curve having an aspherical shape around a rotating axis parallel to the main scan-corresponding direction. In FIG. 10, this curve is shown as an aspherical curve and is generally represented by the above-mentioned formula (1). This concave face of the elongated toroidal lens 16 is a barrel type toroidal face having a radius of curvature in the cross scan-corresponding direction reduced as the barrel type toroidal face is separated from an optical axis of the elongated toroidal lens 16 in a main scanning direction.

Since this concave face of the elongated toroidal lens 16 has an aspherical shape in the main scan-corresponding direction, the elongated toroidal lens 16 slightly has refracting power in the main scan-corresponding direction. Accordingly, scanning characteristics provided by the image forming mirror 15 for an equal speed optical scan can be more precisely corrected by this refracting power. Refracting power in the cross scan-corresponding direction tends to be negatively increased as the concave face is separated from the optical axis in the main scan-corresponding direction. A method for negatively increasing this refracting power is determined by the above aspherical curve. Accordingly, field curvature in a cross scanning direction can be preferably corrected by optimizing the above aspherical curve.

Three concrete examples of the optical arrangement with respect to the above embodiment shown in FIG. 9 will next be explained.

Notations of a reflecting face shape and a setting position of the image forming mirror 15 for an equal speed optical scan are similar to those in the above concrete examples 1 to 6. In this case, in the following concrete examples 7 to 9, the light beam emitted from the light source device is formed as a linear image in the vicinity of the deflecting-reflecting face with respect to the cross scan-corresponding direction. Accordingly, an object point with respect to the cross scan-corresponding direction is provided in a position of the deflecting-reflecting face at an angle of deflection equal to zero in an image forming system constructed by the image forming mirror 15 for an equal speed optical scan and the elongated toroidal lens 16. The above $S_0$ shows a position of the object point as an image formed by this image forming system in the main scan-corresponding direction. Namely, the above $S_0$ shows a distance from the reflecting face.

As shown in FIG. 10, $r_{M1}$ and $r_{M2}$ with respect to the elongated toroidal lens 16 respectively set to radii of curvature in the main scan-corresponding direction on the optical axis. Further, $r_{S1}$ and $r_{S2}$ with respect to the elongated toroidal lens 16 are respectively set to radii of curvature in the cross scan-corresponding direction.

The above formula (1) representing the aspherical curve is changed to the following formula (1') so as to discriminate this formula (1) from that in the case of a reflecting face shape of the image forming mirror 15 for an equal speed optical scan.

$$x(H) = cH^2/[1 + \sqrt{\{1 - (1 + k) c^2 H^2\}}] + \Sigma a_i \cdot H^{**i} \quad (1')$$

A shape of the barrel type toroidal face is specified by giving $r_{M1}$ (=1/c), $r_{M2}$, k, $a_4$, $a_6$, $a_8$ and $a_{10}$. Reference numerals d and n are respectively set to a thickness and a refractive index of the elongated toroidal lens 16 on the optical axis thereof. Reference numeral L is set to the length of an optical path from the image forming mirror 15 for an equal speed optical scan to the elongated toroidal lens 16 when the angle of deflection is equal to zero. In each of the concrete examples 7 to 9, a field angle is set to ±40 degrees.

CONCRETE EXAMPLE 7

$S_0 = 3195.348$, $L_0 = 123.9363$,
$R = -450.805$, $K = -6.0$, $A_4 = -1.94713 \times 10^{-9}$,
$A_6 = -3.38967 \times 10^{-14}$, $A_8 = -1.06176 \times 10^{-18}$,
$A_{10} = 5.52547 \times 10^{-23}$ parametric values in condition (I):

$\Delta X(H=0.1f)/f=7.08\times10^{-6}$ $L = 93.5986$
$r_{M1} = 672.814$, $k = -26.795$,
$a_4 = -4.42196 \times 10^{-9}$, $a_6 = 5.21009 \times 10^{-15}$,
$a_8 = 1.77155 \times 10^{-18}$, $a_{10} = 5.93227 \times 10^{-23}$,
$r_{S1} = 66.2$ $d = 10.0522$ $n = 1.5721$
$r_{M2} = 513.138$, $r_{S2} = 29.88$

CONCRETE EXAMPLE 8

$S_0 = -2170.887$, $L_0 = 119.4972$,
$R = -411.47$, $K = -2.8$, $A_4 = -2.93396 \times 10^{-10}$,
$A_6 = -2.12903 \times 10^{-14}$, $A_8 = -1.47848 \times 10^{-18}$,
$A_{10} = -1.29558 \times 10^{-23}$ parametric values in condition (I):

$\Delta X(H=0.1f)/f = 4.11 \times 10^{-6}$ $L = 102.9569$
$r_{M1} = 696.497$, $k = -8.21113$,
$a_4 = -2.70152 \times 10^{-9}$, $a_6 = -3.60551 \times 10^{-15}$,
$a_8 = 1.64493 \times 10^{-18}$, $a_{10} = 7.58201 \times 10^{-23}$
$r_{S1} = 62.8$  $d = 4.2575$  $n = 1.5721$
$r_{M2} = 628.778$, $r_{S2} = 29.5$

CONCRETE EXAMPLE 9

$S_0 = -1712.082$, $L_0 = 124.179$,
$R = -405.046$, $K = -1.46661$,
$A_4 = 3.12269 \times 10^{-10}$, $A_6 = -9.19756 \times 10^{-15}$,
$A_8 = -1.14431 \times 10^{-18}$, $A_{10} = -1.39095 \times 10^{-23}$ parametric values in condition (I):

$\Delta X(H=0.1f)/f = 2.55 \times 10^{-6}$ $L = 105.53.53$
$r_{M1} = 692.522$, $k = -1.7171$,
$a_4 = -8.45792 \times 10^{-10}$, $a_6 = 1.09879 \times 10^{-14}$,
$a_8 = 1.47422 \times 10^{-18}$, $a_{10} = 2.92312 \times 10^{-23}$,
$r_{S1} = 69.2$  $d = 3.254$  $n = 1.5721$
$r_{M2} = 667.087$, $r_{S2} = 30.8$ FIGS. 11a to 13b are diagrams showing field curvature and scanning characteristics of the optical scanner. In FIGS. 11a to 13b, a broken line shows field curvature in the main scan-corresponding direction and a solid line shows field curvature in the cross scan-corresponding direction. As can be seen from FIGS. 11a to 13b, performance of the optical scanner is further improved in comparison with the concrete examples 1 to 6.

FIG. 14 shows an optical scanner having an eighth construction of the present invention in accordance with one embodiment of the present invention. For brevity, constructional portions similar to those in FIG. 9 are designated by the same reference numerals as FIG. 9.

A divergent light beam is emitted from a semiconductor laser as a light source 10 and is transmitted through a coupling lens 12. In accordance with a tenth construction of the present invention, the coupling lens 12 changes the transmitted light beam to a convergent light beam. In accordance with an eleventh construction of the present invention, the coupling lens 12 changes the transmitted light beam to a divergent light beam. In accordance with a twelfth construction of the present invention, the coupling lens 12 changes the transmitted light beam to a substantially parallel light beam. The light source 10 and the coupling lens 12 constitute a light source device.

The light beam emitted from the light source device is transmitted through a cylindrical lens 13 and is converged only in a cross scan-corresponding direction. The light beam is then formed as a linear image extending in a main scan-corresponding direction in the vicinity of a deflecting-reflecting face of an optical deflector 14.

The light beam reflected on the deflecting-reflecting face is further reflected on an image forming mirror 15A for an equal speed optical scan. This light beam is then converged as a light spot on a photoconductive photosensitive body 17. The photoconductive photosensitive body 17 is arranged such that a generating line of the photosensitive body 17 is in conformity with a main scanning line L on a scanned face. The photosensitive body 17 is optically scanned by the converged light beam at an equal speed as the light beam is deflected by the optical deflector 14 at an equal angular velocity.

An image forming action of the image forming mirror 15A for an equal speed optical scan will next be described with respect to each of the main scan-corresponding direction and the cross scan-corresponding direction. With respect to the main scan-corresponding direction, the light beam transmitted through the coupling lens 12 is converged by only the image forming mirror 15A for an equal speed optical scan as a light spot on the photosensitive body 17.

In contrast to this, with respect to the cross scan-corresponding direction, as mentioned above, an image formed by the image forming mirror 15A for an equal speed optical scan constitutes a light spot on the photosensitive body 17 in a state in which a linear image extending in the main scan-corresponding direction and focused and formed by the cylindrical lens 13 is provided as an object point. This linear image is formed in the vicinity of the deflecting-reflecting face. Accordingly, with respect to the cross scan-corresponding direction, the image forming mirror 15A for an equal speed optical scan approximately sets positions of the deflecting-reflecting face and a scanned face in a conjugate relation in geometrical optics.

FIGS. 15a to 15c show three typical examples of optical path separating systems similar to those in FIGS. 2a to 2c.

Each of FIGS. 15a and 15b shows an optical path separating system in which the light beam incident to the image forming mirror 15A for an equal speed optical scan is inclined in the cross scan-corresponding direction set to a vertical direction in these figures. In FIG. 15a, the light beam reflected on the image forming mirror 15A for an equal speed optical scan is directly incident to the photosensitive body 17. This optical path separating system shown in FIG. 15a is used in the optical scanner shown in FIG. 14. In contrast to this, in FIG. 15b, an optical path of the reflected light beam is bent by an elongated mirror 18 so as to guide the light beam to a photosensitive body 17. FIG. 15c shows an optical path separating system using an elongated half mirror Similar to the examples of FIGS. 2a to 2c, in the example of FIG. 15a, an optical path separating means is constructed by inclining the light beam incident to the image forming mirror 15A for an equal speed optical scan in the cross scan-corresponding direction. In the example of FIG. 15b, the optical path separating means is constructed by inclining the incident light beam and using the elongated mirror 18. In the example of FIG. 15c, the optical path separating means is constructed by using the elongated half mirror 19.

In the optical path separating systems shown in FIGS. 15a and 15b, the locus of an incident position of a deflected light beam incident to the image forming mirror 15A for an equal speed optical scan is not parallel to a main scan-corresponding direction perpendicular to a paper face of FIGS. 15a to 15c, but is formed in a curved shape. Therefore, in such optical path separating systems, a main scanning line on a scanned face is not formed as a straight line, but is curved so that a scanning line is curved. Such a curve of scanning line can be effectively corrected by slightly inclining an optical axis of the image forming mirror 15A for an equal speed optical scan in the cross scan-corresponding direction. Otherwise, such a curve in scanning line can be effectively corrected by slightly displacing the image forming mirror 15A in parallel with the cross scan-corresponding direction and setting a position of the image forming mirror 15A. Further, such a curve of scanning line can be effectively corrected by combining such parallel displacement and this inclination with each other.

FIG. 29 is a view for explaining the shape of a reflecting face of an image forming mirror for an equal speed optical scan having a seventh construction of the present invention.

When X and H axes are determined as shown in FIG. 29, a curve X(H) is a curve provided by the above-mentioned formula (1) on an X-H plane. As mentioned above, "C" in the formula (1) shows curvature of the curve X(H) at an origin O on the X-H plane. Namely, "C" in the formula (1) shows curvature of the curve X(H) when H=0. Reference numeral Ax designates an axis parallel to the H-axis on the X-H plane. A shape of the reflecting face of the image forming mirror for an equal speed optical scan shown in FIG. 14 satisfies the above condition (I) with respect to the shape of a concave face obtained by rotating the curve X(H) around the axis Ax. In an optical arrangement, a positive direction (on a left-hand side) of the X-axis in FIG. 29 corresponds to a side of the light source device and an H-axis direction is equal to a main scan-corresponding direction. In the following description, $R_M$ is set to a radius of curvature as an inverse number of the above curvature C provided when H=0 is set in the curve X(H). $R_S$ shown in FIG. 29 is set to a distance between the axis Ax and the curve X(H) on the X-axis. In this case, $R_S$ provides a radius of curvature of the reflecting face on the optical axis in the cross scan-corresponding direction. $R_S$ is negative on a side from the origin 0 toward a light source.

Eight concrete examples of the optical arrangement with respect to the optical scanner shown in FIG. 14 will next be explained.

In each of these concrete examples, the shape of the reflecting face of the image forming mirror 15A for an equal speed optical scan is specified by giving the radii $R_M$ and $R_S$ of curvature on the optical axis, a conical constant K and aspherical coefficients $A_4$, $A_8$, $A_8$ and $A_{10}$. The radii $R_M$ and $R_S$ of curvature are inverse numbers of "C" in the above formula (1). C' in the condition (I) is equal to C since the aspherical coefficient $A_2$ is equal to zero.

$S_0$ shows the position of an object point with respect to "an image forming function relative to the main scan-corresponding direction" of the image forming mirror 15A for an equal speed optical scan when an angle of deflection is equal to zero. Namely, $S_0$ shows a distance from the reflecting face. $S_0$ is set to be negative when this object point is located on this side with respect to the reflecting face as a light source side on an optical path. The object point with respect to an image forming function in the cross scan-corresponding direction is provided as the above-mentioned linear image. A position of this linear image is set to a position of the deflecting-reflecting face when the angle of deflection is equal to zero. $L_0$ shows a distance from the deflecting-reflecting face to the reflecting face of the image forming mirror 15A for an equal speed optical scan when the angle of deflection is equal to zero.

The light beam for an optical scan emitted from the light source device is set to a convergent, divergent or parallel light beam. When $S_0$ is negative, the light beam emitted from the light source device is set to a divergent or convergent light beam. Accordingly, there is a case in which the light beam is converged in front of the image forming mirror 15A for an equal speed optical scan with respect to the main scan-corresponding direction. In contrast to this, when $S_0$ is positive, the light beam emitted from the light source device is set to a convergent light beam. In this case, a natural converging position is located behind the image forming mirror 15A for an equal speed optical scan with respect to the main scan-corresponding direction. The natural converging position is a position in which the light beam is naturally converged when there is no image forming mirror 15A for an equal speed optical scan on the optical path. $S_0$ is infinite ($\infty$) when the light beam emitted from the light source device is set to a parallel light beam.

A field angle is set to ±35 degrees in each of the concrete examples 10 to 17.

CONCRETE EXAMPLE 10

$S_0 = 54.821$, $L_0 = 164.44$,
$R_M = -595.47$, $K = 17.0$, $A_4 = -7.63462 \times 10^{-10}$,
$A_6 = 4.31645 \times 10^{-14}$, $A_8 = 4.31794 \times 10^{-18}$,
$A_{10} = 9.5 \times 10^{-22}$, $R_S = -72.256$ parametric value in condition (I):

$\Delta X(H=0.1f)/f=-2.91 \times 10^{-5}$ $S_0 = 112.44$, $L_0 = 160.2$,
$R_M = -425.562$, $K = -1.533$, $A_4 = -5.1 \times 10^{-9}$,
$A_6 = -5.0876 \times 10^{-14}$, $A_8 = 1.7162 \times 10^{-19}$,
$A_{10} = 3.077 \times 10^{-22}$, $R_S = -100.86$ parametric value in condition (I):

$\Delta X(H=0.1f)/f=-2.54 \times 10^{-6}$

CONCRETE EXAMPLE 12

$S_0=141.2'2$, $L_0=163.68$,
$R_M=-442.06$, $K=1.0$, $A_4=-1.32 \times 10^{-10}$,
parametric values in condition (I):

$R_S=-112.84$ $\Delta X(H=0.1f)/f=-1.71 \times 10^{-6}$

CONCRETE EXAMPLE 13

$S_0 = 250.8$, $L_0 = 121.2$,
$R_M = -360.626$, $K = -3.44$, $A_4 = -5.44171 \times 10^{-9}$,
$A_6 = -1.79832 \times 10^{-13}$, $A_8 = -6.90425 \times 10^{-18}$,
$A_{10} = 3.2688 \times 10^{-22}$, $R_S = -112.46$ parametric value in condition (I):

$\Delta X(H=0.1f)/f=2.14 \times 10^{-6}$

CONCRETE EXAMPLE 14

$S_0 = 316.0016$, $L_0 = 129.7842$,
$R_M = -493.642$, $K = -10.0$, $A_4 = -2.5417 \times 10^{-9}$,
$A_6 = -1.0703 \times 10^{-13}$, $A_8 = -6.08724 \times 10^{-18}$,
$A_{10} = -5.5486 \times 10^{-22}$, $R_S = -134.0$ parametric value in condition (I):

$\Delta X(H=0.1f)/f=1.16 \times 10^{-5}$

CONCRETE EXAMPLE 15

$S_0 = 40.0$, $L_0 = 220.0$,
$R_M = -400.0$, $K = -21.0$, $A_4 = -7.20102 \times 10^{-9}$,
$A_6 = -1.32545 \times 10^{-13}$, $A_8 = -5.73894 \times 10^{-18}$,
$A_{10} = -1.0 \times 10^{-21}$, $R_S = -55$ parametric value in condition (I):

$\Delta X(H=0.1f)/f=2.63 \times 10^{-5}$

CONCRETE EXAMPLE 16

$S_O = -2491.026$, $L_O = 71.026$,
$R_M = -223.885$, $K = -1.09$, $A_4 = 7.94 \times 10^{-10}$,
$A_6 = 6.686 \times 10^{-14}$, $A_8 = 3.298 \times 10^{-17}$,
$A_{10} = -2.4068 \times 10^{-20}$, $R_S = -89.28$ parametric value in condition (I):

$\Delta X(H=0.1f)/f=1.822 \times 10^{-6}$

CONCRETE EXAMPLE 17

$S_O = -723.52$, $L_O = 58.52$,
$R_M = -187.505$, $K = -1.26$, $A_4 = 2.67 \times 10^{-9}$,
$A_6 = -4.53 \times 10^{-13}$, $A_8 = -4.136 \times 10^{-17}$,
$A_{10} = -9.43 \times 10^{-21}$, $R_S = -76.72$ parametric value in condition (I):

$\Delta X(H=0.1f)/f=2.1866 \times 10^{-6}$

In each of these concrete examples, no light beam emitted from the light source device is set to a parallel light beam. However, in the case of the concrete example 16, the position of the object point with respect to the main scan-corresponding direction is extremely separated from the reflecting face so that the light beam from the light source device can be considered as a substantially parallel light beam.

FIGS. 16a to 23b are diagrams sequentially showing field curvature and scanning characteristics of the optical scanner with respect to the above concrete examples 10 to 17. In each of FIGS. 16a to 23b, a broken line shows field curvature in a main scanning direction and a solid line shows field curvature in a cross scanning direction.

FIG. 24 shows an optical scanner having a ninth construction of the present invention in accordance with one embodiment of the present invention. For brevity, constructional portions similar to those in FIG. 9 are designated by the same reference numerals as FIG. 9.

A divergent light beam is emitted from a light source 10 and is transmitted through a coupling lens 12. The light source 10 and the coupling lens 12 constitute a light source device. The light beam emitted from the light source device is transmitted through a cylindrical lens 13 and is converged only in a cross scan-corresponding direction. The light beam is then formed as a linear image extending in a main scan-corresponding direction in the vicinity of a deflecting-reflecting face of an optical deflector 14.

The light beam reflected on the deflecting-reflecting face is incident to an image forming mirror 15B fop an equal speed optical scan through a negative cylindrical lens 9 as a cylindrical optical element. This light beam is then reflected on the image forming mirror 15B for an equal speed optical scan and is converged as a light spot on a photosensitive body 17. The photosensitive body 17 is optically scanned by the light beam at an equal speed along a main scanning line L as the light beam is deflected by the optical deflector 14 at an equal angular velocity.

FIG. 25 shows an optical path from the optical deflector 14 to the photosensitive body 17 seen from the main scan-corresponding direction. The light beam is deflected by the optical deflector 14 on a plane perpendicular to a rotating axis of the deflecting-reflecting face of the optical deflector 14. This plane is called a scanning deflecting face in the following description. The optical path of the light beam is bent by the negative cylindrical lens 9 in the cross scan-corresponding direction. The light beam is then incident to the image forming mirror 15B for an equal speed optical scan. Accordingly, the cylindrical lens 9 constitutes a portion of an optical path separating means in this example.

The cylindrical lens 9 has negative refracting power in the cross scan-corresponding direction. Accordingly, with respect to the cross scan-corresponding direction, the image forming mirror 15B for an equal speed optical scan and the cylindrical lens 9 focus and form the linear image on a scanned face.

An optical axis of the cylindrical lens 9 is shifted from the above scanning deflecting face by a shifting amount $\Delta Z1$ in the cross scan-corresponding direction. An optical axis of the image forming mirror 15B for an equal speed optical scan is shifted from the scanning deflecting face by a shifting amount $\Delta Z2$ in the cross scan-corresponding direction. The optical axes of the cylindrical lens 9 and the image forming mirror 15B as an optical system are parallel to the scanning deflecting face. The shifting amounts $\Delta Z1$ and $\Delta Z2$ are set to be positive with the scanning deflecting face as a reference when these optical axes are shifted upward as shown by $\Delta Z2$ in FIG. 25. The shifting amounts $\Delta Z1$ and $\Delta Z2$ are set to correct the above-mentioned curve of scanning line.

For example, an optical path of the deflected light beam shown in FIG. 25 is bent upward by a converging action of the cylindrical lens 9. When FIG. 25 shows an angle of deflection of the deflected light beam equal to zero, the length of an optical path from the cylindrical lens 9 to a reflecting face of the image forming mirror 15B for an equal speed optical scan is increased as the angle of deflection is increased. Accordingly, an incident position of the light beam incident to the reflecting face is located further upward in comparison with the incident position shown in FIG. 25. However, curvature of the reflecting face of the image forming mirror 15B for an equal speed optical scan is increased as this reflecting face is separated from an optical axis thereof in the main scan-corresponding direction. Accordingly, the reflected light beam tends to be strongly deflected on a lower side in FIG. 25. The curve of scanning line is corrected by using this tendency.

Three concrete examples of the optical arrangement with respect to the embodiment shown in FIG. 24 will next be explained.

Similar to the above concrete examples 10 to 17, a shape of the reflecting face of the image forming mirror 15B for an equal speed optical scan is specified and the above shifting amount $\Delta Z2$ is provided with respect to a setting position of the image forming mirror 15B.

As shown in FIG. 25, the cylindrical lens 9 is constructed by a flat concave lens having a flat lens face on a side of the image forming mirror 15B for an equal speed optical scan. Accordingly, the cylindrical lens 9 is specified by giving a radius Rcy of curvature of an incident side lens face of the cylindrical lens 9 in the cross scan-corresponding direction, a thickness t and a refractive index n of the cylindrical lens 9. An arranging position of the cylindrical lens 9 is specified by giving a distance L1 shown in FIG. 25, a projecting distance L2 and the shifting amount $\Delta Z1$. The distance L1 is set to a distance on an optical axis between the deflecting-reflecting face and a cylindrical lens face on an optical deflector side when the angle of deflection is equal to zero. The projecting distance L2 is set to a distance projected onto the scanning deflecting face between the cylindrical lens face on a side of the image forming mirror 15B for an equal speed optical scan and the reflecting face of this image forming mirror 15B.

Namely, an arranging position of the image forming mirror 15B for an equal speed optical scan is determined by the distances L1, L2 and the shifting amount $\Delta Z2$.

A field angle is set to ±35 degrees in each of the concrete examples 18 to 20.

CONCRETE EXAMPLE 18

$S_0 = -2491.026$,
$R_M = -223.885$, $K = -1.09$, $A_4 = 7.94 \times 10^{-10}$,
$A_6 = 6.686 \times 10^{-14}$, $A_8 = 3.298 \times 10^{-17}$,
$A_{10} = -2.4068 \times 10^{-20}$, $R_S = -85$,
$Rcy = -35$, $t = 5$, $n = 1.51118$,
$L1 = 20$, $L2 = 46.026$, $\Delta Z1 = -13$, $\Delta Z2 = 2.65$, parametric value in condition (I):

$\Delta X(H=0.1f)/f=1.822 \times 10^{-6}$

CONCRETE EXAMPLE 19

$S_0 = 250.8$,
$R_M = -360.626$, $K = -3.44$, $A_4 = -5.44171 \times 10^{-9}$,
$A_6 = -1.79832 \times 10^{-13}$, $A_8 = -6.90425 \times 10^{-18}$,
$A_{10} = 3.22688 \times 10^{-22}$, $R_S = -110.7$,
$Rcy = -45$, $t = 5$, $n = 1.51118$,
$L1 = 20$, $L2 = 96.2$, $\Delta Z1 = -13$, $\Delta Z2 = 3.33$, parametric value in condition (I):

$\Delta X(H=0.1f)/f=2.14 \times 10^{-6}$

CONCRETE EXAMPLE 20

$S_0 = -1257.69$,
$R_M = -239.607$, $K = -1.23$, $A_4 = 2.233 \times 10^{-9}$,
$A_6 = 2.065 \times 10^{-13}$, $A_8 = 5.279 \times 10^{-17}$,
$A_{10} = -1.805 \times 10^{-20}$, $R_S = -90.171$
$Rcy = -48.468$, $t = 5$, $n = 1.51118$,
$L1 = 20$, $L2 = 47.25$, $\Delta Z1 = -15$, $\Delta Z2 = 2.55$, parametric value in condition (I):

$\Delta X(H=0.1f)/f=2.312 \times 10^{-6}$

FIGS. 26a to 26c are diagrams showing field curvature, scanning characteristics and curve of scanning line of the optical scanner in the concrete examples 18 to 20. In FIGS. 26a to 26c a broken line shows field curvature in the main scan-corresponding direction and a solid line shows field curvature in the cross scan-corresponding direction. As can be seen from FIGS. 26a to 26c, performance of the optical scanner is further improved in comparison with the concrete examples 10 to 17.

In the above concrete examples 18 to 20, the curve of scanning line is corrected by shifting the cylindrical lens 9 and the image forming mirror 15B for an equal speed optical scan. The curve of scanning line can be also corrected by inclining the cylindrical lens 9 and the image forming mirror 15B for an equal speed optical scan in the cross scan-corresponding direction. The curve of scanning line can be also corrected by combining such inclination and shift with each other. Further, the cylindrical optical element is not limited to the cylindrical lens, but can be constructed by using a cylindrical mirror.

Further, the cylindrical optical element can be arranged between the image forming mirror and the scanned face if a length of the cylindrical optical element can be increased. In this case, the curve of scanning line can be also corrected by the above shift and/or inclination.

As mentioned above, in accordance with the present invention, it is possible to provide a novel image forming mirror for an equal speed optical scan and a novel optical scanner.

When the image forming mirror for an equal speed optical scan having the above-mentioned first construction of the present invention is used in the optical scanner having each of the second to sixth constructions, it is possible to perform an optical scanning operation at an equal speed and preferably correct field curvature in a main scanning direction. Accordingly, the diameter of a light spot can be stabilized so that the optical scanning operation can be preferably performed.

In the optical scanner having the above-mentioned third construction of the present invention, the inclination of a deflecting face of an optical deflector can be corrected so that a scanning operation can be performed at an equal speed and field curvature in each of main and cross scanning directions can be preferably corrected extremely. Accordingly, the diameter of a light spot can be stabilized so that the optical scanning operation can be preferably performed.

When the image forming mirror for an equal speed optical scan having the above-mentioned seventh construction of the present invention is used in the optical scanner having each of the eighth to twelfth constructions, it is possible to perform an optical scanning operation at an equal speed and preferably correct field curvature in a main scanning direction. Accordingly, the inclination of a deflecting face of an optical deflector can be corrected and the diameter of a light spot can be stabilized so that the optical scanning operation can be preferably performed.

In the optical scanner having each of the above-mentioned ninth to twelfth constructions, it is possible to perform an optical scanning operation at an equal speed and preferably correct field curvature in a main scanning direction. Accordingly, the inclination of a deflecting face of an optical deflector can be corrected and a curve of scanning line caused by using an image forming mirror system can be effectively corrected. Thus, the diameter of a light spot can be stabilized so that the optical scanning operation can be preferably performed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner comprising:

a light source device for emitting a light beam for an optical scan;

a linear image forming optical system for converging the light beam from this light source device in a cross scan-corresponding direction and focusing and forming this light beam as a linear image extending in a main scan-corresponding direction;

an optical deflector having a deflecting-reflecting face in the vicinity of a forming position of said linear image and deflecting a reflected light beam as a deflected light beam at an equal angular velocity;

an image forming mirror for converging the deflected light beam onto a scanned face;

optical path separating means for separating an optical path of the light beam reflected on this image forming mirror from an incident optical path from said light source device to the image forming mirror; and an elongated toroidal lens extending in the main scan-corresponding direction and separated by this optical path separating means and arranged on an optical path from said image forming mirror toward the scanned face;

the elongated toroidal lens converging the deflected light beam as a light spot onto the scanned face in cooperation with said image forming mirror;

said image forming mirror being constructed by an image forming mirror for an equal speed optical scan in which a light beam deflected at the equal angular velocity is converged onto the scanned face and a scanning speed of the light spot on the scanned face is equalized;

the image forming mirror having a reflecting face formed in coaxial, aspherical and concave shapes;

the reflecting face being obtained by rotating a curve $X(H)$ represented by the following formula, $$X(H)=CH^2/[1+\sqrt{\{1-(1+K)C^2H^2\}}]+\Sigma A_i \cdot H^{**i}$$

around an X-axis where C is a constant giving curvature on an optical axis on the reflecting face, H is a variable giving a distance from the optical axis in a direction perpendicular to the optical axis, K is a conical constant, A is an aspherical coefficient and i is a whole number;

said curve $X(H)$ being set such that a value $\Delta X(H)$ represented by $$\Delta X(H)=X(H)-C'H^2/[1+\sqrt{\{1-C'^2H^2\}}]$$

satisfies the following condition (I), $$-3.0\times10^{-5} < \Delta X(H=0.1f)/f < 3.0\times10^{-5} \qquad (I)$$

when $C'=C+2A_2$ and f is set to a focal length of said reflecting face;

said elongated toroidal lens having a barrel type toroidal face as a concave face formed such that this barrel type toroidal face is obtained by rotating a curve having an aspherical shape around an axis parallel to the main scan-corresponding direction and has a radius of curvature in the cross scan-corresponding direction reduced as the barrel type toroidal face is separated from an optical axis thereof in a main scanning direction; and said elongated toroidal lens having a normal toroidal face as a convex face.

2. An optical scanner as claimed in claim 1, wherein the light beam incident to the deflecting-reflecting face of the optical deflector is convergent or divergent with respect to the main scan-corresponding direction.

3. An optical scanner comprising:

an image forming mirror for an equal speed optical scan in which a light beam deflected at an equal angular velocity and divergent with respect to a cross scan-corresponding direction is converged as a light spot onto a scanned face and a scanning speed of the light spot on the scanned face is equalized;

the image forming mirror having a reflecting face formed in concave and aspherical shapes;

the reflecting face being obtained by rotating a curve $X(H)$ represented by the following formula, $$X(H)=CH^2/[1+\sqrt{\{1-(1+K)C^2H^2\}}]+\Sigma A_i \cdot H^{**i}$$

around an axis parallel to an H-axis where C is a constant giving curvature on an optical axis on the reflecting face, H is a variable giving a distance from the optical axis in a direction perpendicular to the optical axis, K is a conical constant, A is an aspherical coefficient and i is a whole number;

said curve $X(H)$ being set such that a value $\Delta X(H)$ defined by $$\Delta X(H)=X(H)-C'H^2/[1+\sqrt{\{1-C'^2H^2\}}]$$

satisfies the following condition (I), $$-3.0\times10^{-5} < \Delta X(H=0.1f)/f < 3.0\times10^{-5} \qquad (I)$$

when $C'=C+2A_2$ and f is set to a focal length of said reflecting face on an X-H face;

a light source device for emitting a light beam for an optical scan;

a linear image forming optical system for converging the light beam from this light source device in a cross scan-corresponding direction and focusing and forming the light beam as a linear image extending in a main scan-corresponding direction;

an optical deflector having a deflecting-reflecting face in the vicinity of a forming position of said linear image and deflecting a reflected light beam as a deflected light beam at an equal angular velocity;

optical path separating means for separating an optical path of the light beam reflected on the image forming mirror from an incident optical path from said light source device to the image forming mirror; and a cylindrical optical element arranged between the optical deflector and the image forming mirror and having refracting power only in the cross scan-corresponding direction.

4. An optical scanner as claimed in claim 3, wherein the light beam incident to the deflecting-reflecting face of the optical deflector is convergent in the main scan-corresponding direction.

5. An optical scanner as claimed in claim 3, wherein the light beam incident to the deflecting-reflecting face of the optical deflector is divergent in the main scan-corresponding direction.

6. An optical scanner as claimed in claim 3, wherein the light beam emitted from the light source device is a parallel light beam.

* * * * *